United States Patent [19]
Yamada et al.

[11] Patent Number: 5,761,543
[45] Date of Patent: Jun. 2, 1998

[54] APPARATUS FOR MEASURING ANTERIOR EYE PORTION

[75] Inventors: Akira Yamada; Yoshiaki Irie, both of Yokohama; Akihiko Nagano, Ichihara, all of Japan

[73] Assignee: Canon Kabushiki Kaisha, Tokyo, Japan

[21] Appl. No.: 792,120

[22] Filed: Jan. 31, 1997

Related U.S. Application Data

[63] Continuation of Ser. No. 617,017, Mar. 18, 1996, abandoned, which is a continuation of Ser. No. 142,091, Oct. 28, 1993, abandoned.

[30] Foreign Application Priority Data

Oct. 29, 1992  [JP]  Japan .................................. 4-291724
Oct. 30, 1992  [JP]  Japan .................................. 4-292546

[51] Int. Cl.$^6$ ...................................................... G03B 13/02
[52] U.S. Cl. ............................................................. 396/51
[58] Field of Search ................................. 396/51; 348/78

[56] References Cited

U.S. PATENT DOCUMENTS

| 5,182,443 | 1/1993 | Suda et al. | 250/201.2 |
| 5,245,371 | 9/1993 | Nagano et al. | 354/62 |
| 5,606,390 | 2/1997 | Arai et al. | 396/51 |

FOREIGN PATENT DOCUMENTS

1-274736  11/1989  Japan .

Primary Examiner—W. B. Perkey
Attorney, Agent, or Firm—Fitzpatrick, Cella, Harper & Scinto

[57] ABSTRACT

There is disclosed an apparatus including an illuminating unit for illuminating an eyeball, a light-receiving unit for receiving light reflected by the eyeball to measure the state of an anterior eye portion, and a holding unit for holding the illuminating unit and the light-receiving unit. The apparatus can be easily assembled, and optical characteristics are properly determined to accurately detect the state of the anterior eye portion.

5 Claims, 19 Drawing Sheets

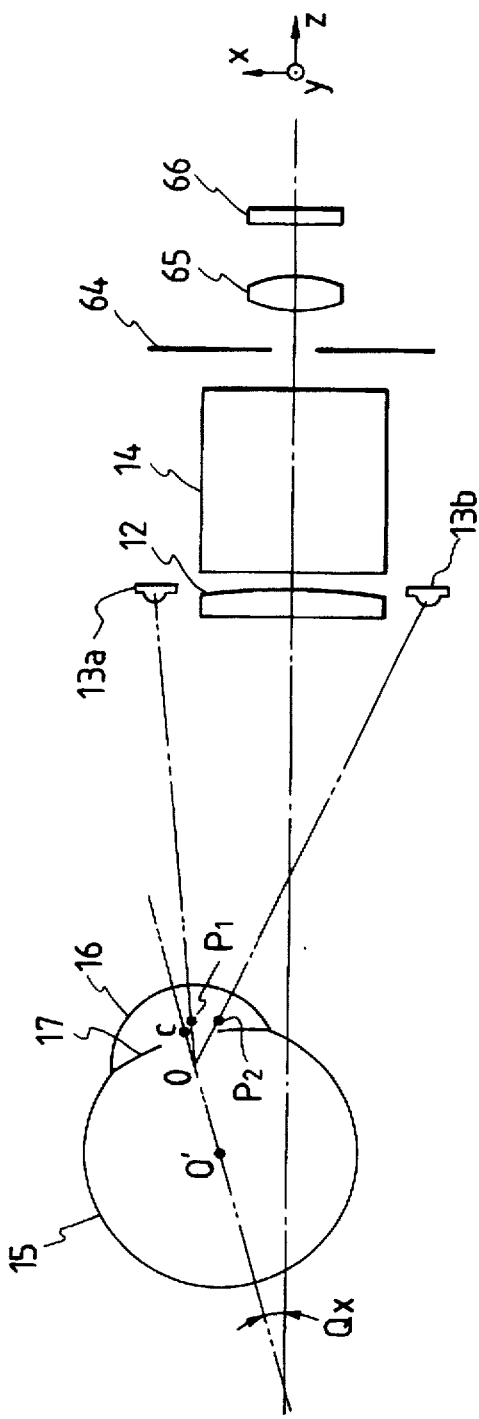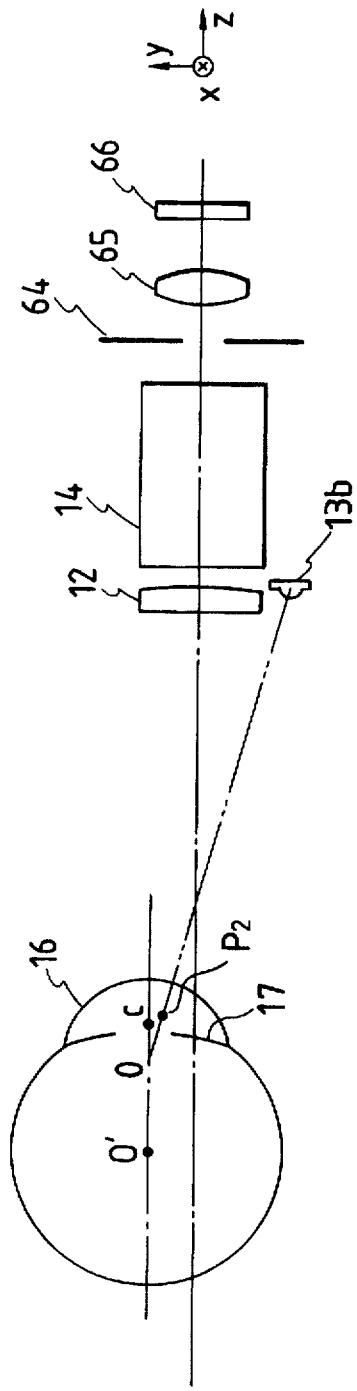

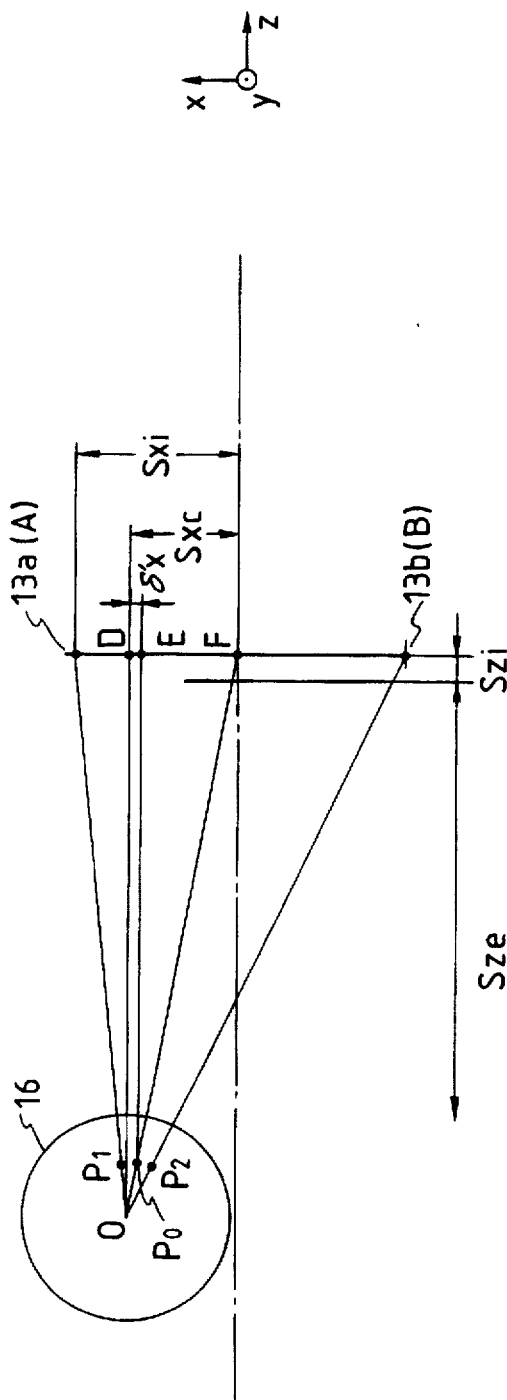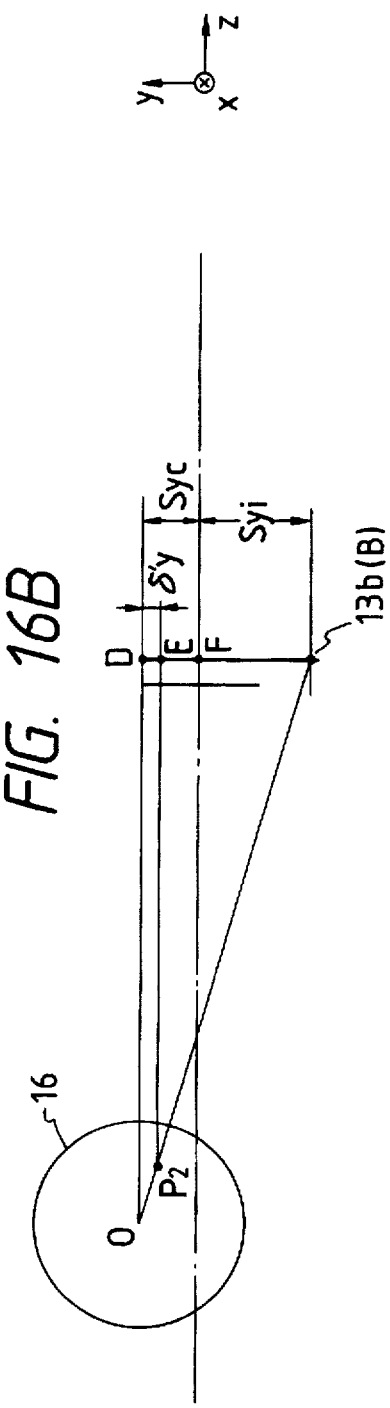

APPARATUS FOR MEASURING ANTERIOR EYE PORTION

This application is a continuation of application Ser. No. 08/617,017 filed Mar. 18, 1996, which is a continuation of 08/142,091 filed Oct. 28, 1993, both abandoned.

BACKGROUND OF THE INVENTION

1. Field of the Invention

The present invention relates to an apparatus for measuring an anterior eye portion and, more particularly, to a visual axis detection apparatus. More specifically, the present invention relates to a visual axis detection apparatus for utilizing an image reflected by an eyeball and obtained upon illumination of the surface of the eyeball of an observer (photographer) to detect an axis, i.e., a so-called visual axis, in a gazing direction along which the observer performs observation through a finder system on an observation plane (focusing plane) on which an object image from a photographic system is formed, thereby using detection results in a variety of photographic operations.

2. Related Background Art

Various types of conventional apparatuses (e.g., an eye camera) for detecting the specific position on an observation plane, which is observed by an observer, i.e., for detecting a so-called visual axis have been proposed.

For example, in Japanese Laid-Open Patent Application No. 1-274736, a parallel beam is radiated from a light source onto the anterior eye portion of the eyeball of an observer, and the visual axis is detected utilizing a cornea reflection image obtained by light reflected by a cornea and the imaging position of a pupil.

FIG. 12 is a view for explaining the principle of a method of detecting a visual axis, and FIGS. 13A and 13B are views for explaining an eyeball's images projected on the surface of an image sensor 214 in FIG. 12 and the intensities of outputs from the image sensor 214, respectively.

A method of detecting a visual axis will be described with reference to FIGS. 12, 13A, and 13B. Infrared-emitting diodes 213a and 213b are arranged symmetrical about an optical axis $ax_1$ of a light-receiving lens 212 in the X direction. The infrared-emitting diodes 213a and 213b emit divergent infrared rays on the eyeball of the photographer.

The infrared rays emitted from the infrared-emitting diode 213b illuminate a cornea 216 of an eyeball 215. At this time, a cornea reflection image d obtained by some of the infrared rays reflected by the surface of the cornea 216 is focused by the light-receiving lens 212 and imaged again at a position d' on the image sensor 214.

The infrared rays emitted from the infrared-emitting diode 213a illuminate the cornea 216 of the eyeball 215. At this time, a cornea reflection image e obtained by some of the infrared rays reflected by the surface of the cornea 216 is focused by the light-receiving lens 212 and imaged again at a position e' on the image sensor 214.

Similarly, beams from end portions a and b of an iris 217 are focused as images of the end portions a and b at positions a' and b' on the image sensor 214 through the light-receiving lens 212. Assume that a rotational angle $\theta$ of an optical axis $ax_2$ of the eyeball 215 with respect to the optical axis (optical axis $ax_1$) of the light-receiving lens 212 is small. In this case, a coordinate $X_c$ of a central position c of a pupil 219 is defined as follows:

$$X_c \cong (X_a + X_b)/2$$

where $X_a$ and $X_b$ are X-coordinates of the end portions a and b of the iris 217.

The X-coordinate of the middle point between the cornea reflection images d and e coincides with an X-coordinate $X_0$ of the center O of curvature of the cornea 216. Let the X-coordinates of the positions d and e of the cornea reflection images be $X_d$ and $X_e$, a standard distance from the center O of the curvature of the cornea 216 to the center c of the pupil 219 be $L_{oc}$, and a coefficient in consideration of individual differences for the distance $L_{oc}$ be A1. The rotational angle $\theta$ of the optical axis $ax_2$ of the eyeball satisfies the following relation:

$$(A1 \times L_{oc}) \times \sin\theta \equiv X_c - (X_d + X_e)/2 \qquad (1)$$

For this reason, in a visual axis arithmetic operation apparatus, positions of characteristic points (i.e., the cornea reflection images d and e and the end portions a and b of the iris) projected on part of the image sensor, as shown in FIG. 13B, are detected to obtain the rotational angle $\theta$ of the optical axis $ax_2$ of the eyeball. At this time, relation (1) can be rewritten as follows:

$$\beta(A1 \times L_{oc}) \times \sin\theta \equiv (X_a' + X_b')/2 - (X_d' + X_e')/2 \qquad (2)$$

where $\beta$ is a magnification determined in accordance with the position of the eyeball with respect to the light-receiving lens 212. The magnification $\beta$ can be substantially obtained as a function of distance $|X_d' - X_e'|$ between the cornea reflection images. The rotational angle $\theta$ of the eyeball 215 is written as follows:

$$\theta \equiv ARCSIN\{(X_c' - X_f')/\beta/(A1 \times L_{oc})\} \qquad (3)$$

for $$X_c' \cong (X_a' + X_b')/2$$
$$X_f' \cong (X_d' + X_e')/2$$

The optical axis $ax_2$ of the eyeball of the photographer does not coincide with the visual axis. For this reason, when the horizontal rotational angle of the optical axis $ax_2$ of the eyeball of the photographer is calculated, an angle between the optical axis of the eyeball and the visual axis is corrected by a correction angle $\delta$ to obtain a horizontal visual axis $\theta H$ of the photographer. If a coefficient given in consideration of individual differences for the correction angle $\delta$ between the optical axis $ax_2$ of the eyeball and the visual axis is defined as B1, the horizontal visual axis $\theta H$ of the photographer is obtained as follows:

$$\theta H = \theta \pm (B1 \times \delta) \qquad (4)$$

Signs ± represent that if the eye of the photographer who observes an object image through the observation apparatus is a left eye, the sign+ is selected; if a right eye, the sign— is selected, provided that a clockwise rotational angle with respect to the photographer is defined to be positive.

In FIGS. 12, 13A, and 13B, the eyeball of the photographer rotates within the Z-Y plane (e.g., a horizontal plane). However, if the eye of the photographer rotates within the Z-Y plane (e.g., a vertical plane), the visual axis can be detected in the same manner as described above. Note that a vertical visual axis $\theta V$ is defined as $\theta V = \theta'$ because the vertical component of the visual axis of the photographer is equal to a vertical component $\theta'$ of the optical axis of the eyeball. A position $(X_n, Y_n)$ on the focusing screen within a finder field, which is gazed by the photographer, is defined as follows using the visual axis data $\theta H$ and $\theta V$:

$$X_n \simeq m \times \theta H \quad (5)$$
$$\simeq m \times |\text{ARCSIN}\{(X_c' - Z_f')/\beta/(A1 \times L_{oc})\} \pm$$
$$(B1 \times \delta)|$$
$$Y_n \simeq m \times \theta V$$

where m is a constant determined by the finder optical system of a camera.

The coefficients A1 and B1 for correcting individual differences of eyeballs of photographers are obtained such that an index located at a predetermined position within the finder of the camera is gazed by the photographer and that the position of the index is caused to coincide with a gazing position calculated by equations (5).

Note that the visual axis and gazing point of the photographer are calculated by computer software in the visual axis arithmetic operation unit based on the above equations.

The coefficients for correcting the individual differences between visual axes are determined to correspond to horizontal rotation of the eyeball of an ordinary observer. The two indices arranged within the camera finder are marked to be horizontal with respect to the observer.

When the coefficients for correcting the individual differences between the visual axes are determined, the focusing screen position of the visual axis of the observer who observes an object image through the camera finder is calculated using equations (5), and the resultant visual axis information is used for the focal point adjust operation of a photographic lens, exposure control, and the like.

In the visual axis detection apparatus, it is necessary to detect a minute eyeball motion such as a movement (shift) and rotation. It is, therefore, important to align the optical axis of the finder optical system with the optical axis of a visual axis detection optical system (e.g., the optical system of a light-receiving means and the optical system of an illuminating means).

For this reason, optical components of each optical system and mechanical components for holding the optical components must have very strict precision, and the manufacturing cost and component supply (yield) pose problems.

To mount a photoelectric conversion element and a visual axis detection apparatus in a high-precision optical equipment such as a camera, they must be made compact. For this reason, the magnification of an eyeball image obtained by an imaging lens with respect to the eyeball must be minimized, e.g., β=1/10 times. To satisfy this requirement, the above high-precision components must be used to accurately align the position of the photoelectric conversion element with a predetermined position, e.g., align the optical axis with the center of the photoelectric conversion element.

On the other hand, in a visual axis detection apparatus having a light-receiving means and a finder means, when an observer wears a pair of glasses, an image obtained by light reflected by the surface of the glass lens is reflected again on the surface of the eyepiece of the finder means or the surface of an optical path dividing member. The resultant light serves as a light source and is reflected again on the surface of the glass lens to form a ghost image. The ghost image is formed at almost the same position as that of the cornea reflection image described with reference to the principle of visual axis detection. As a result, visual axis detection cannot be performed. A similar problem is also posed when external light has a high intensity.

SUMMARY OF THE INVENTION

The present invention has been made to solve the conventional problems described above, and has as its primary object to provide an apparatus for measuring an anterior eye portion, and especially a visual axis detection apparatus, wherein the optical axis of an observation optical system can be aligned with the optical axis of a visual axis detecting system with a simple arrangement without using high-precision components.

It is another object of the present invention to provide an apparatus capable of eliminating hazardous light and accurately measuring an anterior eye portion.

It is still another object of the present invention to provide a visual axis detection apparatus capable of stably performing visual axis detection for a photographer who wears a pair of glasses.

BRIEF DESCRIPTION OF THE DRAWINGS

FIGS. 15A and 15B are a developed plan view and a developed side view, respectively, showing a visual axis detection optical system;

FIG. 16A is a developed plan view of the visual axis detection optical system to explain the size in FIG. 15A, and FIG. 16B is a developed side view of the visual axis detection optical system to explain the size in FIG. 15B;

DETAILED DESCRIPTION OF THE PREFERRED EMBODIMENTS

Figure 1:
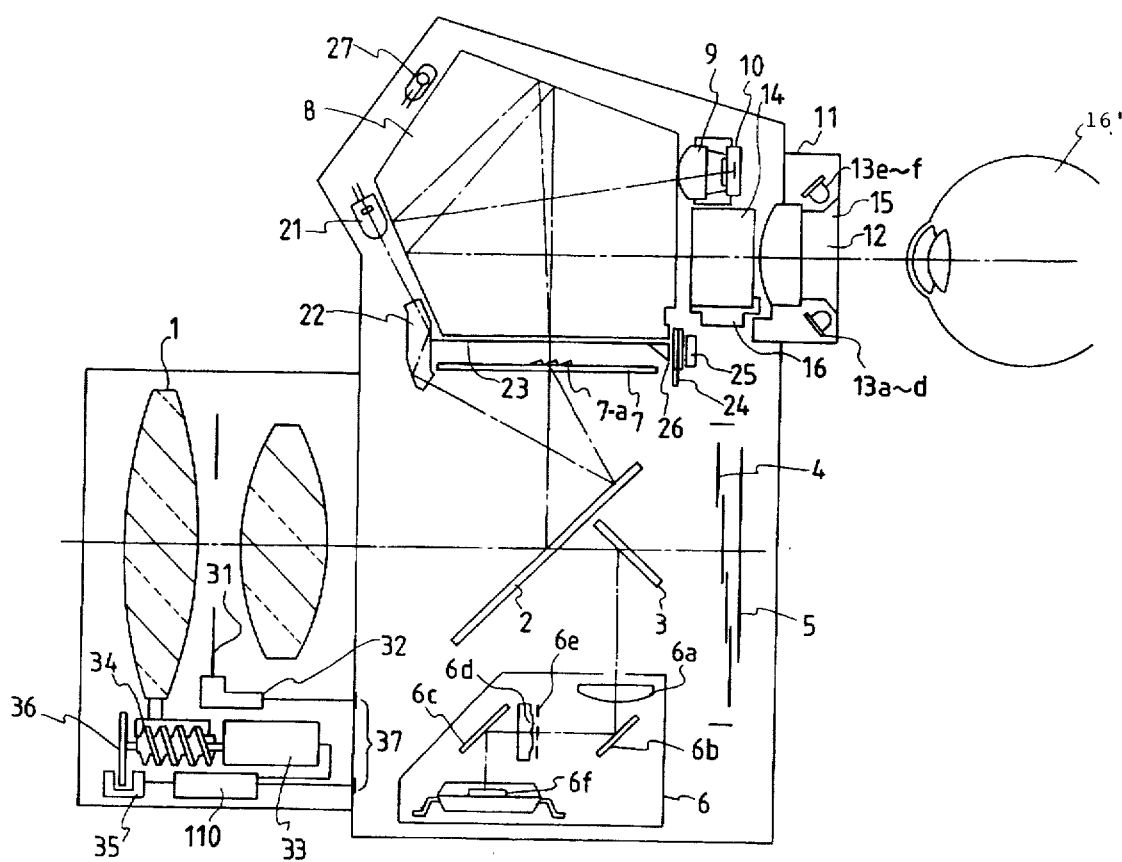
FIG. 1 is a sectional view showing a camera to which the present invention is effectively embodied.
Figure 2:
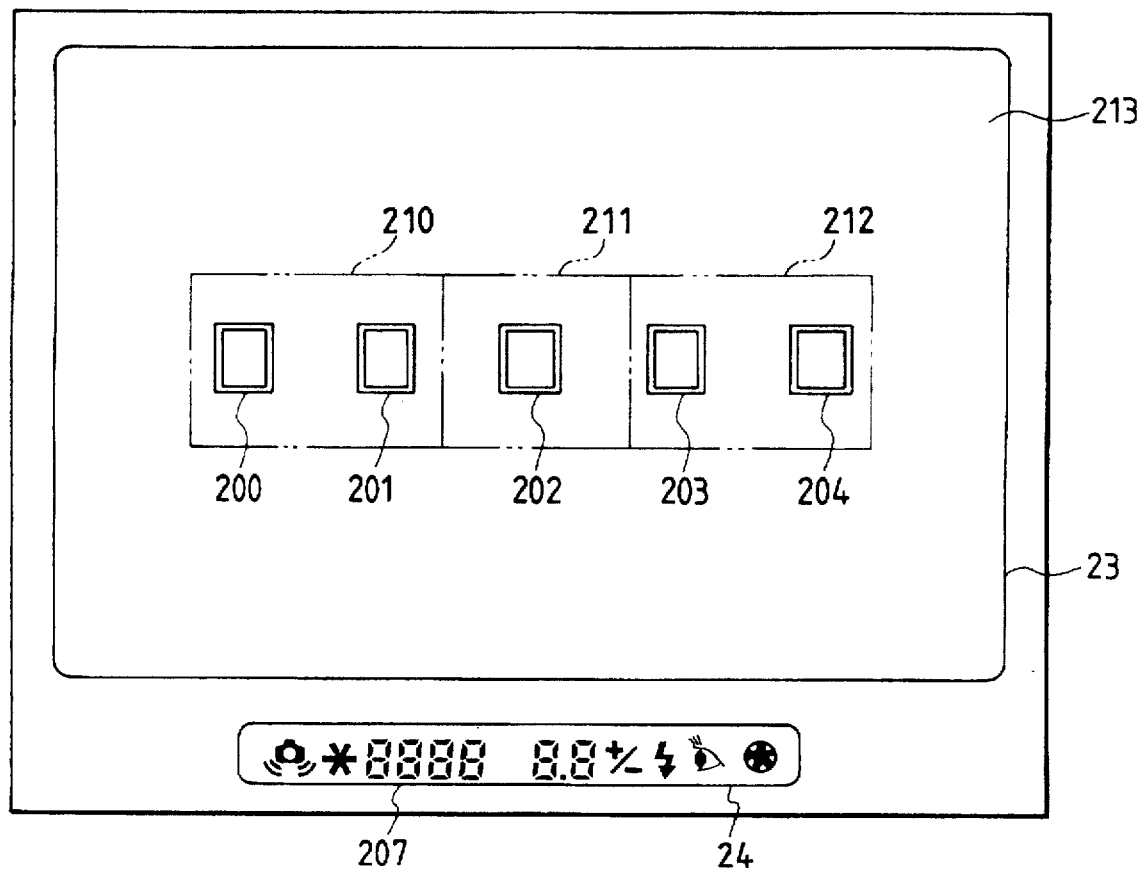
FIG. 2 is a view showing a finder in the camera shown in FIG. 1.

FIGS. 1 to 11 show an embodiment of the present invention. FIG. 1 is a schematic view of a single-lens reflex camera to which an apparatus of the present invention is effectively applied, and FIG. 2 is a view showing a finder field. Referring to FIGS. 1 and 2, a photograph lens 1 is illustrated to have two lenses, but comprises a large number of lenses in practice. A main mirror 2 is inclined in a photographic optical path or retracted from the photographic optical axis in accordance with an observation or photographic state. A sub mirror 3 reflects downward a light beam passing through the main mirror 2 in the camera body. The camera has a shutter 4. A photosensitive member 5 comprises a sliver salt film, a solid-state image pickup element such as a CCD or MOS sensor, or an image pickup tube such as a vidicon.

A focal point detection unit 6 of a known phase difference scheme includes a field lens 6a located near an imaging plane, reflecting mirrors 6b and 6c, a secondary imaging lens 6d, an aperture 6e, and a line sensor 6f constituted by a plurality of CCDs. As shown in FIG. 2, the focal point detection unit 6 is arranged to detect focal points in a plurality (five) of areas within an observation screen. A focusing screen 7 is located on a prospective imaging plane of the photographic lens 1. A pentagonal roof prism 8 is used to change the optical path of a finder. An imaging lens 9 and a photometric sensor 10 are used to measure the object brightness within the observation screen. The imaging lens 9 causes the focusing screen 7 to conjugate to the photometric sensor 10 through a reflection optical path in the pentagonal roof prism 8.

A visual axis detection unit 11 according to the present invention is located behind the exit plane of the pentagonal roof prism 8. The visual axis detection unit 11 will be briefly described below.

An eyepiece 12 is located on the observer side and used to cause an eyeball 16' of an observer to observe the focusing screen 7. A beam splitter 14 is located between the pentagonal roof prism 8 and the eyepiece 12 and comprises, e.g., a dichroic prism for transmitting visible light and reflecting an infrared ray. The beam splitter 14 guides infrared rays to the light-receiving lens located in a direction perpendicular to the drawing surface and an image sensor obtained by two-dimensionally arranging photoelectric elements such as CCDs, thereby detecting an eyeball's image of the eyeball 16' of the observer.

Infrared-emitting diodes 13a to 13f serve as illumination light sources and are arranged around the eyepiece 12 so as to be symmetrical about the optical axis. The visual axis detection unit also includes an eyepiece holder 15 and a prism holder 16', which will be described in detail later.

Light from a high-luminance LED 21 can be visually checked even in a bright object. Light from the LED 21 is reflected by a projection prism 22 and the main mirror 2, vertically deflected by a small prism array 7a located in the display unit of the focusing screen 7, and reaches the eyeball of the observer through the pentagonal roof prism 8, the beam splitter 14, and the eyepiece 12. The small prism array 7a is formed in a frame-like shape at a position corresponding to the focal point detection area of the focusing screen 7. The prism elements are illuminated with five superimposition LEDs 21 (LED-L1, LED-L2, LED-C, LED-R1, and LED-R2), respectively. As can be apparent from the finder field shown in FIG. 2, distance measurement point marks 200, 201, 202, 203, and 204 are illuminated with light rays from the above LEDs, so that a desired focal point detection area (distance measurement point) can be displayed (this will be referred to as superimposition display hereinafter).

A field mask 23 forms a finder field area. An LCD 24 in the finder displays photographic information outside the finder field. The LCD 24 is illuminated with an illumination LED (F-LED) 25. Light passing through the LCD 24 is guided to the finder through a triangular prism 26 and displayed as indicated by reference numeral 207 outside the finder screen, as shown in FIG. 2, so that the photographer can know the photographic information. A known mercury switch 27 detects the posture of the camera.

An aperture 31 is arranged in the photographic lens 1. An aperture drive unit 32 includes an aperture drive circuit 111 (to be described later). A motor 33 drives the photographic lens 1. A lens drive member 34 comprises drive gears. A photocoupler 35 detects rotation of a pulse plate 36 interlocked with the lens drive member 34 and transmits a detection signal to a lens focal point adjust circuit 110. The focal point adjust circuit 110 drives the lens drive motor on the basis of this information and lens drive amount information from the camera side to move the photographic lens 1 to the in-focus position. Mount contacts 37 serve as a known interface between the camera and the lens.

Figure 3:
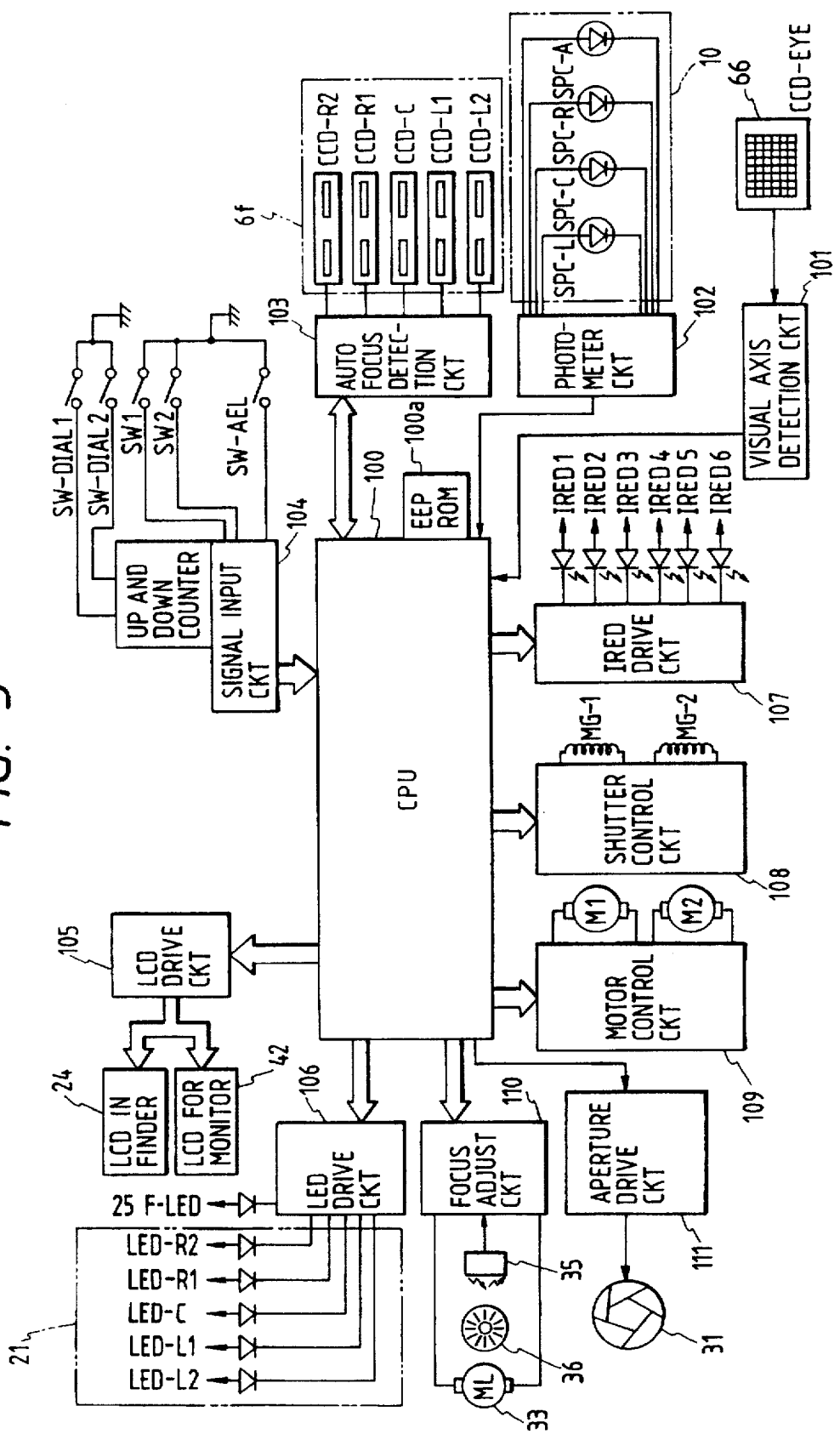
FIG. 3 is a control block diagram of the camera shown in FIG. 1.

FIG. 3 is a diagram showing an electrical circuit incorporated in the camera of this embodiment. The same reference numerals as in FIG. 1 denote the same parts in FIG. 3. A central processing unit (to be referred to as a CPU hereinafter) 100 of a microcomputer incorporated in the camera body is connected to a visual axis (sight axis) detection circuit 101, a photometry circuit (photometer) 102, an auto focal point (auto focus) detection circuit 103, a signal input circuit 104, an LCD drive circuit 105, an LED drive circuit 106, an IRED drive circuit 107, a shutter control circuit 108, and a motor control circuit 109. The CPU receives signals from the focal point adjust circuit 110 and the aperture drive circuit 111 arranged in the photographic lens through the mount contacts 37 shown in FIG. 1. An EEPROM 100a incorporated in the CPU 100 has a function of storing visual axis calibration data.

The visual axis detection circuit 101 A/D-converts the output of the eyeball's image from an image sensor 66 (CCD-EYE) and sends the digital image information to the CPU. The CPU 100 extracts each characteristic point of an eyeball's image necessary for visual axis detection in accordance with a predetermined algorithm and also calculates the visual axis of the photographer in accordance with the position of each characteristic point.

The photometry circuit 102 amplifies the output from the photometric sensor 10 and performs logarithmic compression and A/D conversion of the amplified signal. The photometry circuit 102 then sends the resultant data as each sensor brightness information to the CPU 100. The photometric sensor 10 comprises four photodiodes, i.e., a photodiode SPC-L for performing the photometric operation of a left area 210 including the left distance measurement points 200 and 201 within the finder screen shown in FIG. 2, a photodiode SPC-C for performing the photometric operation of a central area 211 including the central distance measurement point 202, a photodiode SPC-R for performing the photometric operation of a right area 212 including the right distance measurement points 203 and 204, and a photodiode SPC-A for performing the photometric operation of a peripheral area 213.

The line sensor 6f in FIG. 3 comprises a known CCD line sensor constituted by five line sensors CCD-L2, CCD-L1, CCD-C, CCD-R1, and CCD-R2 respectively corresponding to the five distance measurement points 200 to 204 within the screen, as shown in FIG. 2. The auto focal point detection circuit 103 A/D-converts a voltage from the line sensor 6f and sends digital data to the CPU. A photometric switch SW-1 is turned on with the first stroke of a release button 41 and initiates photometry, an AF operation, and visual axis detection. A release switch SW-2 is turned on with the second stroke of the release button. A posture detection switch SW-ANG (not shown) detects the posture of the camera upon operation of the mercury switch 27. An AE lock switch SW-AEL is turned on upon depression of an AE lock button 43. Dial switches SW-DIAL1 and SW-DIAL2 are arranged in a known electronic dial (not shown). These switches are connected to an up and down counter in a signal input circuit 104. The up and down counter counts a rotational click amount of the electronic dial.

The known LCD drive circuit 105 drives a liquid crystal display element LCD. The LCD drive circuit 105 simultaneously displays an f-number, a shutter speed, a set photographic mode, and the like on an LCD 42 for monitor and the LCD 24 in the finder in accordance with signals from the CPU 100. The LED drive circuit 106 controls the ON/OFF operation of the illumination LED (F-LED) 22 and the superimposition LED 21. The IRED drive circuit 107 selectively ON/OFF-controls the infrared-emitting diodes (IREDs 1 to 6) 13a to 13f depending on conditions. Upon energization of the shutter control circuit 108, the shutter control circuit 108 controls a magnet MG-1 for causing a front curtain to run and a magnet MG-2 for causing a rear curtain to run, thereby exposing a photosensitive member with a predetermined light amount. The motor control circuit 109 controls a motor M1 for winding or rewinding a film and a motor M2 for charging the shutter 4. The shutter control circuit 108 and the motor control circuit 109 perform a series of camera release sequences.

Figure 4:
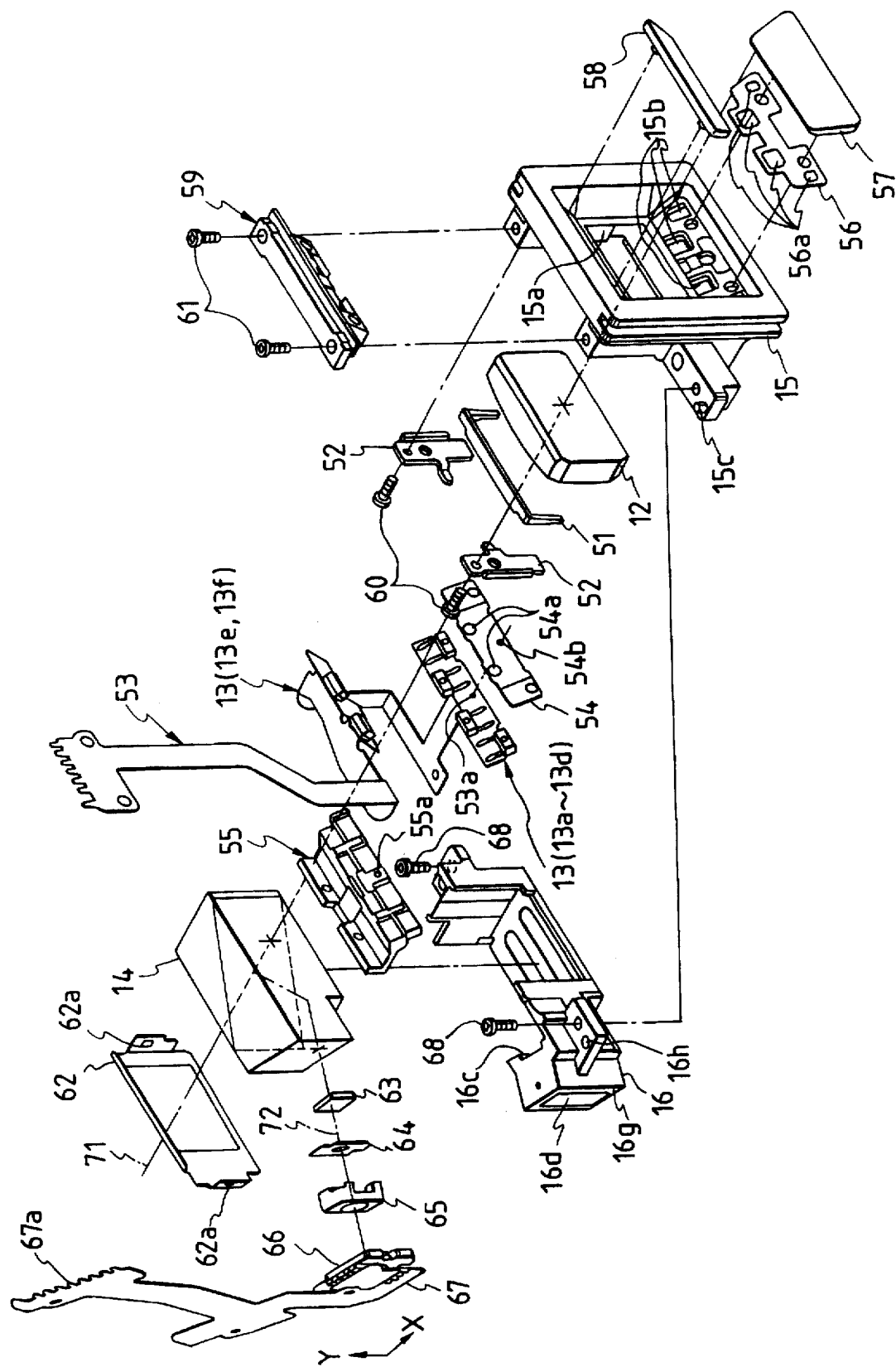
FIG. 4 is an exploded perspective view showing a visual axis detection unit mounted in the camera shown in FIG. 1.
Figure 5:
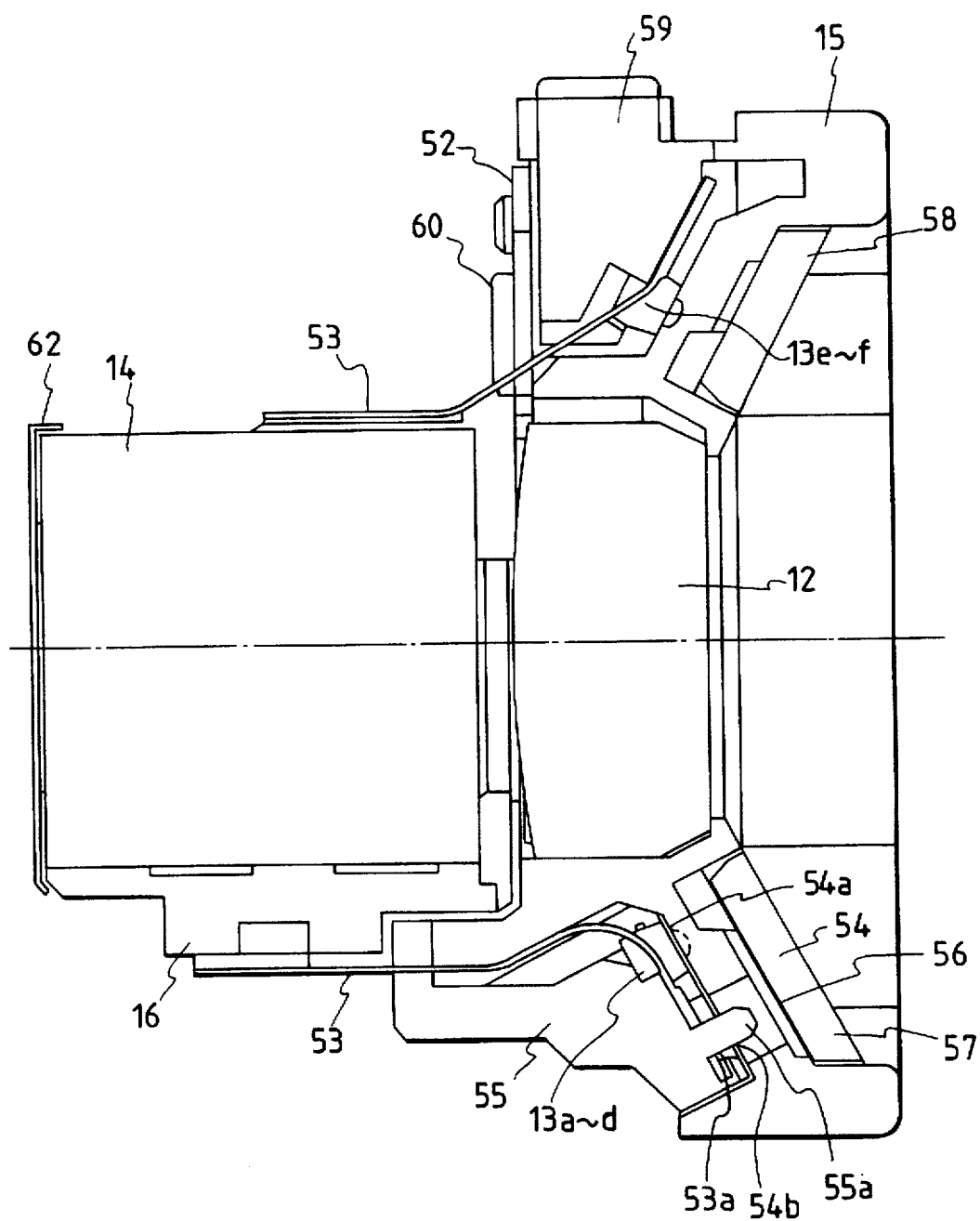
FIG. 5 is a sectional view of the visual axis detection unit shown in FIG. 4.
Figure 6:
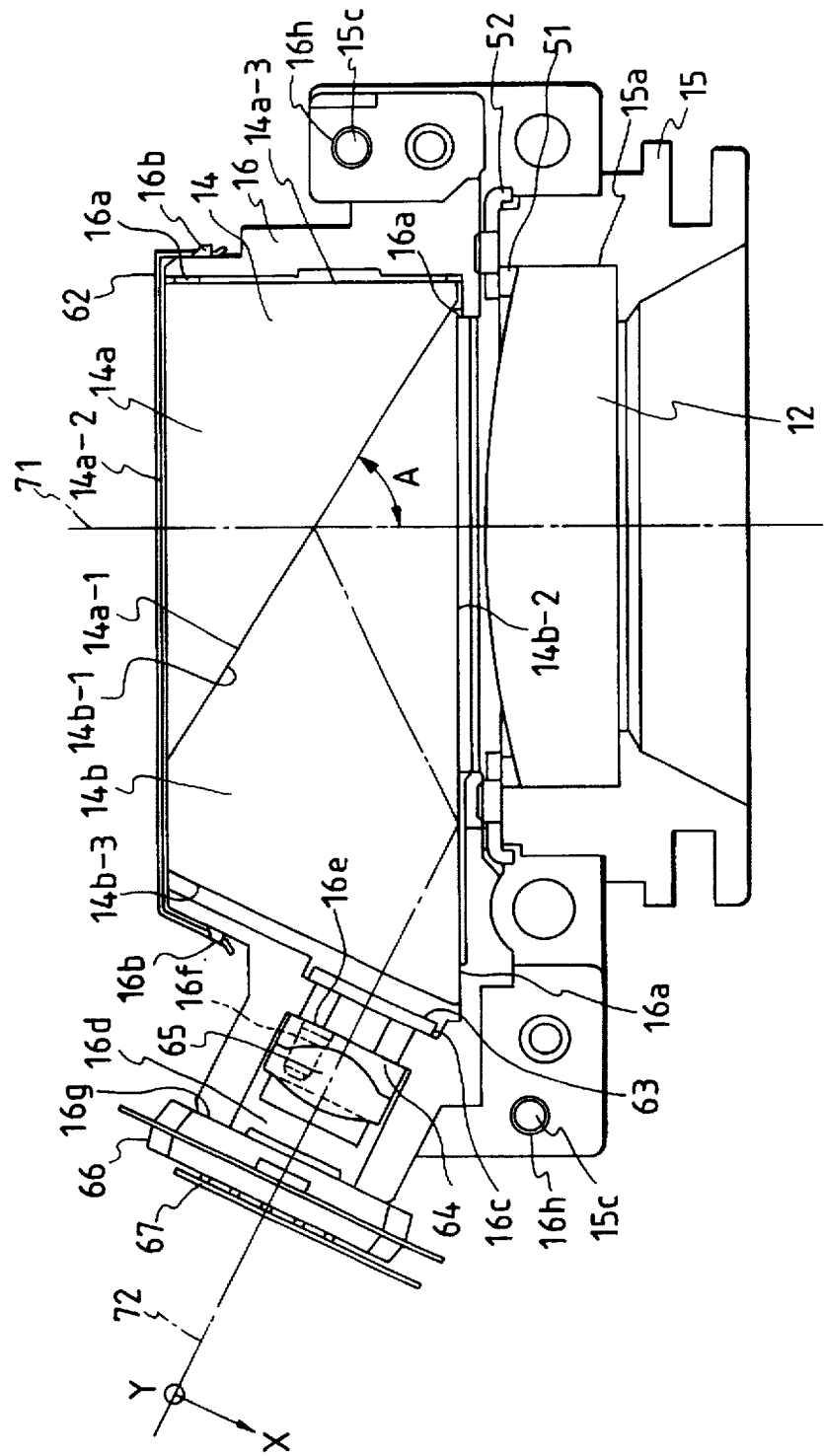
FIG. 6 is a plan view of the visual axis detection unit shown in FIG. 4.

The arrangement of the visual axis detection unit 11 as the main feature of the present invention will be described in detail below. FIG. 4 is a perspective view showing the respective components of the visual axis detection unit, and FIGS. 5 and 6 are a sectional view and a plan view, respectively, showing an assembled state of the visual axis detection unit. The same reference numerals as in FIG. 1 denote the same parts in FIGS. 4, 5, and 6.

The eyepiece 12 is inserted in a recess 15a of the eyepiece holder 15 and fixed to the eyepiece holder 15 by screws 60 through a spacer 51 and press plates 52. This spacer 51 also serves to eliminate light components from the end face of the eyepiece 12 and stray light from the pentagonal roof prism 8. The above components constitute a finder means.

The infrared-emitting diodes 13a to 13f are soldered on a flexible printed board 53 and stored in holding cases 55 and 59 which conform to the overall outer shape of the infrared-emitting diodes 13a to 13f. A mask 54 has predetermined openings 54a to prevent leakage of light from the adjacent infrared-emitting diodes 13. A joggle 55a formed on the holding case 55 is fitted on a positioning hole 53a of the flexible printed board 53, and a positioning hole 54b of the mask 54 which has a size to be forcibly fitted on the joggle is fitted on the joggle 55a, thereby mounting the mask 54. The holding cases 55 and 59 are fixed to the eyepiece holder 15 by an adhesive or screws 61. The infrared-emitting diodes 13 serving as illumination light sources can respectively emit infrared rays through openings 15b formed in the eyepiece holder 15. An aperture mask 56 has openings 56a for limiting illumination areas of the infrared-emitting diodes 13. The aperture mask 56 can shield the ghost of the illumination light from the end face and the peripheral portion of the opening 15b of the eyepiece holder 15. Decorative panels 57 and 58 are made of a visible light absorbent material for transmitting only an infrared ray and absorb visible light, thereby concealing the internal structure from the outside. The aperture mask 56 is interposed between the decorative panel 57 and the eyepiece holder 15, thereby fixing the aperture mask 56 to the eyepiece holder 15. These components constitute an illuminating means.

As described above, all the components constituting the finder means and the illuminating means are housed in the eyepiece holder 15. When the infrared-emitting diodes 13 are mounted, they are precisely and naturally symmetrical about a finder optical axis 71 because the components are incorporated in this single member.

The dichroic prism (beam splitter) 14 is obtained by integrally bonding a triangular prism 14a and a trapezoidal prism 14b, as shown in FIG. 6. A dichroic mirror is deposited on a bonding surface 14a-1 or 14b-1. Visible light incident from an incident surface 14a-2 on the pentagonal roof prism 8 side directly passes through the dichroic mirror and the eyepiece 12 and is focused by the photographic lens 1 to form an object image on the focusing screen 7, so that the observer can observe this object image.

Unlike the visible light, an infrared ray emitted from each of the infrared-emitting diodes 13 and reflected by the eyeball of the observer passes through the eyepiece 12 and an incident surface 14b-2 of the dichroic prism 14 on the eyepiece 12 side and is then reflected by the dichroic mirror. An angle A with the finder optical axis 71 is determined such that all the infrared components from the eyeball are reflected by the dichroic mirror 14b-1 or 14a-1 and totally reflected by the incident surface 14b-2. When this angle A is increased, the thickness of the dichroic prism 14 is decreased to obtain a compact camera. However, the infrared components cannot be totally reflected by the incident surface 14b-2. To the contrary, when the angle A is decreased, the camera becomes bulky. Therefore, the angle A preferably falls within the range of about 55° to 60°.

The dichroic prism 14 is fixed with high precision such that a surface 14a-3 and the surface 14b-2 are brought into contact with and adhered to three joggles 16a formed on the prism holder 16, as shown in FIG. 6. A finder mask 62 is used to conceal the end faces of the dichroic prism 14 and shield stray light from the pentagonal roof prism 8. Two joggles 16b of the prism holder 16 are fitted in mounting holes 62a of the finder mask 62, thereby fixing the finder mask 62. A bandpass filter 63 is adhered to a recess 16c formed on the prism holder 16 near an exit surface 14b-3 of the dichroic prism 14. The filter 63 transmits only light components having wavelengths near the emission spectra of the infrared-emitting diodes, thereby cutting the external light components. The optical characteristics of these components will be described in detail later.

An aperture 64 has a predetermined aperture diameter enough to guide a predetermined amount of light and predetermined imaging characteristics to an image sensor 66. A light-receiving lens 65 is used to focus an eyeball's image on the image sensor. The light reflected by the eyeball is totally reflected by the incident surface 14b-2 of the dichroic prism 14 and passes through the bandpass filter 63 and the aperture 64 through the exit surface 14b-3. The light is finally focused on the image sensor 66 through the light-receiving lens 65. A flexible printed board 67 mounts the image sensor 66 and an IC constituting the visual axis detection circuit thereon. A comb-like connection terminal block 67a formed at one side of the flexible printed board 67 is soldered to a main flexible printed board (not shown) on which the CPU 100 in FIG. 3 is mounted.

Figure 7:
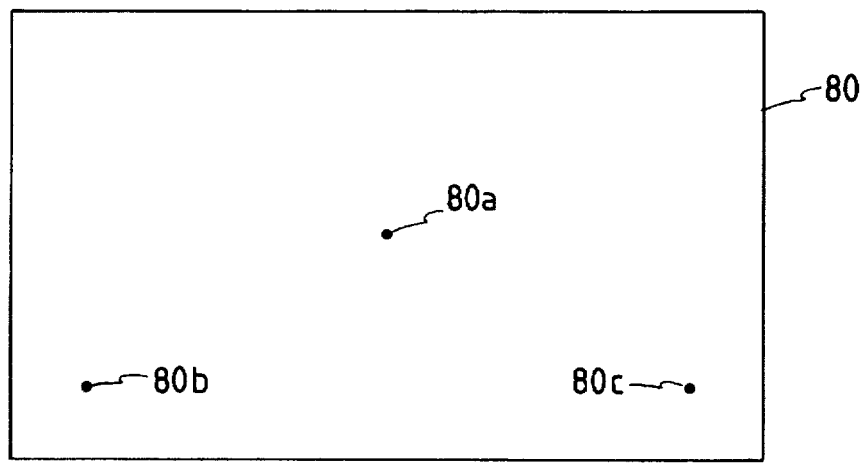
FIG. 7 is a position adjust pinhole chart.

The aperture 64 and the light-receiving lens 65 are incorporated in a bottom surface 16e of a recess 16d of the prism holder 16 in the order named. These components are fixed to the prism holder 16 such that the light-receiving lens 65 is adhered to a mounting joggle 16f (indicated by the dotted line) formed on the prism holder 16. The image sensor 66 is then adhered on a frame-like flat surface 16g of the prism holder 16 which is precisely formed to have a predetermined position from the rear surface of the light-receiving lens 65. The image sensor 66 is thus held in the prism holder 16. A position adjust pinhole chart 80 shown in FIG. 7 is used to determine the adhesion position of the image sensor 66. The pinhole chart is positioned such that a central pinhole 80a is aligned with the finder optical axis 71 in FIG. 6 using a known tool (not shown), and the image sensor 66 is moved by a jig (not shown) such that an image output of the pinhole 80a appears on the central pixel of the image sensor 66.

Assume that the horizontal and vertical directions of the flat mounting surface 16g of the image sensor 66 are defined as X and Y directions, respectively. If the horizontal pixel array direction of the image sensor 66 is defined as a read direction, the inclination of the image sensor 66 in the X and Y directions is adjusted as follows. The image center 66 is slightly rotated about the central pixel on the flat mounting surface 16g, so that image outputs of pinholes 80b and 80c have identical output values on one line. An optical axis 72 of a light-receiving system consisting of the dichroic mirror 14a-1 or 14b-1 of the dichroic prism 14, the bandpass filter 63, the aperture 64, the imaging lens (light-receiving lens) 65, and the image sensor 66 is caused to align with the finder optical axis 71 with respect to the central position in the horizontal and vertical directions. In this state, the image sensor 66 is fixed by a jig, and an adhesive is poured into a space between the flat mounting surface 16g and the image sensor 66 to hold the image sensor 66 in the prism holder 16. As described above, the dichroic prism 14, the bandpass filter 63, the aperture 64, the light-receiving lens 65, and the image sensor 66, which constitute the main members of the light-receiving means are held in the prism holder 16.

High positional accuracy between the components can be easily obtained because all the components are incorporated in a single member. Even if the dichroic prism 14 and the imaging lens 65 are inclined or shifted, the optical axis of the light-receiving optical system can be easily positioned by adjusting only the image sensor 66 mounted in the prism holder 16 because the dichroic prism 14 and the image sensor 66 are integrally mounted in the prism holder 16.

Finally, the eyepiece holder 15 which holds the members constituting the finder means and the illuminating means is coupled to the prism holder 16 which holds the members constituting the light-receiving means to finish the visual axis detection unit 11. Two positioning joggles 15c formed on the eyepiece holder 15 are fitted in positioning holes 16h formed in the prism holder 16 and fixed thereto by screws 68. The finder optical axis 71 and the optical axis 72 of the light-receiving optical system are accurately aligned with the central position of the infrared-emitting diodes 13 in the X direction. Since the eyepiece holder 15 is coupled to the prism holder 16, the visual axis detection unit 11 has all the necessary visual detection functions except for that of the CPU. Therefore, the visual axis detection functions can be adjusted and checked without mounting the visual axis detection unit in a camera body (not shown).

For example, adjustment of outputs from the image sensor, bit error check, check and adjustment of outputs from the infrared-emitting diodes, and the like can be performed without assembling the visual axis detection unit into the camera body. For this reason, the yield of finished products (assembly into camera bodies) in the manufacturing process can be increased. In addition, even if a failure occurs in visual axis detection functions, repairing is completed by replacing the visual axis detection unit 11 with a new one, thus reducing the labor in services. For example, even if dust enters into a space between the eyepiece 12 and the dichroic prism 14 and the photographer can observe the dust through the finder, the dust can be easily removed to clean the assembly because the eyepiece holder 15 can be separated from the prism holder 16.

In this embodiment, the members constituting the visual axis detection apparatus are mounted in the eyepiece holder 15 and the prism holder 16. However, these holders may be integrated into a single holder. All the members may be mounted in this single holder.

A countermeasure against a ghost image (reflection image) formed by the surface of the glass lens and posing a problem unique to a visual axis detection apparatus having the eyepiece 12 and the dichroic prism 14 serving as a beam splitter for splitting light of the finder optical system from light of the light-receiving optical system will be described below.

Figure 8A:
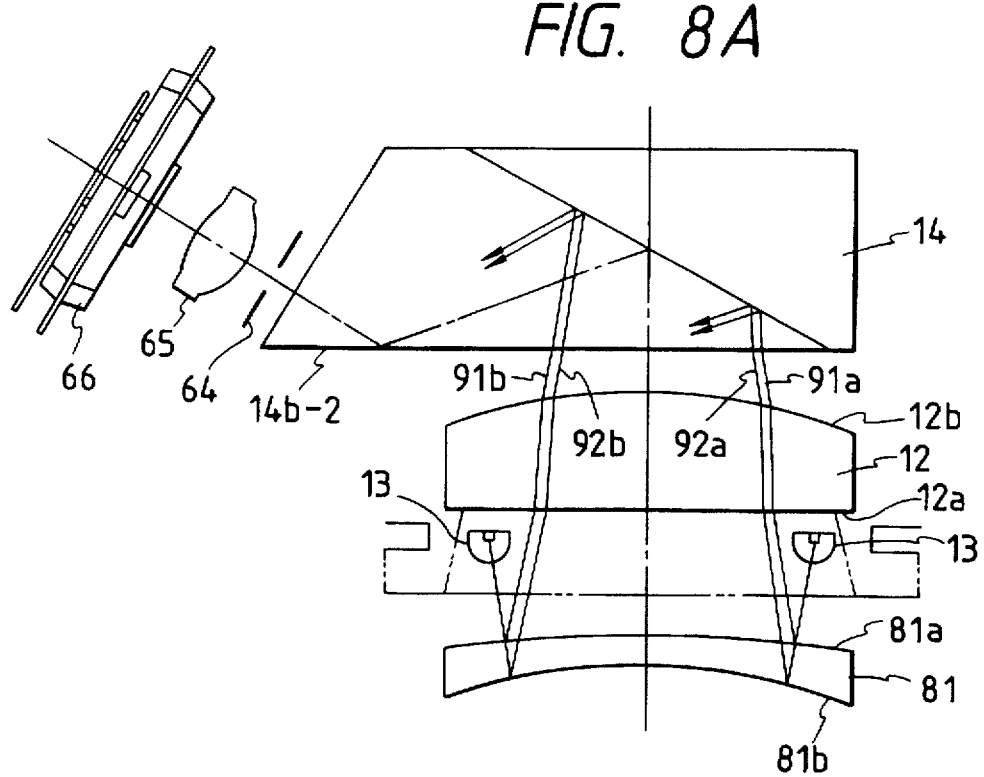
FIGS. 8A and 8B are views showing paths for generating ghost images.
Figure 8B:
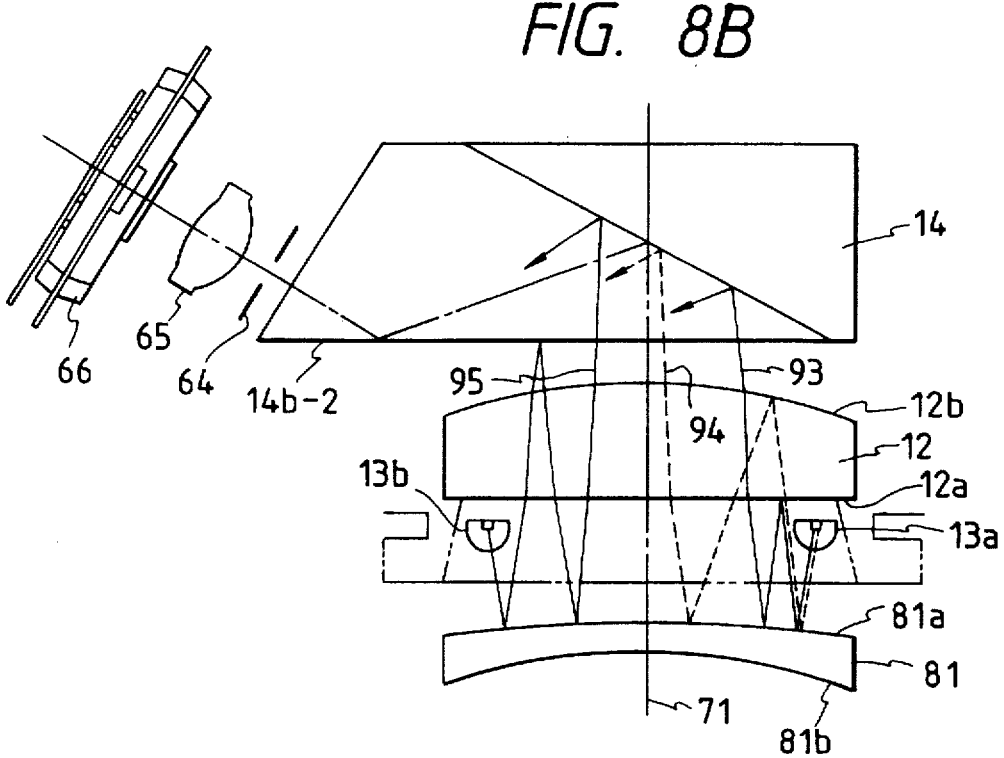
Figure 9A:
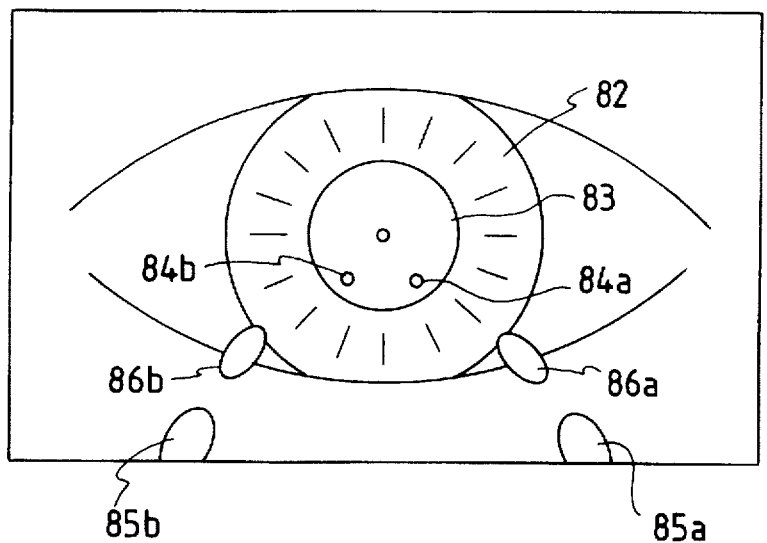
FIGS. 9A and 9B are views showing eyeballs, respectively.

FIGS. 8A and 8B are views showing paths in which ghost images are formed by the surface of the glass lens. Only constituent members of the visual axis detection apparatus which are required for explaining this phenomenon are illustrated. The eyepiece lens 12, the infrared-emitting diodes 13, and the dichroic prism 14 are illustrated as in FIG. 1. The photographer wears a glass 81. As shown in FIG. 8A, ghost images formed by the glass are generally a ghost image formed such that infrared rays generated by infrared-emitting diodes 13 are reflected by a first surface 81a of a glass lens 81, as indicated by optical paths 91a and 91b, and a ghost image formed such that infrared rays emitted from the infrared-emitting diodes 13 are reflected by a second surface 81b of the glass lens 81, as indicated by optical paths 92a and 92b. The corresponding states of the eyeball's images are shown in FIG. 9A. These images include an iris image 82, a pupil's image 83, and cornea reflection images 84a and 84b of light components from the pair of infrared-emitting diodes. Ghost images 85a and 85b are formed by the first surface 81a of the glass lens 81, and ghost images 86a and 86b are formed by the second surface 81b of the glass lens 81. The ghost images formed by single reflection on the surfaces of the glass lens do not overlap the cornea reflection images 84a and 84b by properly determining the layout of the infrared-emitting diodes 13. These ghost images have a higher intensity and a larger size than those of the cornea reflection images. Therefore, the ghost images can be distinguished from the cornea reflection images 84a and 84b in accordance with a detection algorithm without causing any detection error.

An anti-reflection coating constituted by a single- or multi-layered film is generally formed on each glass lens. Some special coatings have a very high reflectivity, and a glass such as a mirror glass naturally has a high reflectivity.

In such a glass, since light reflected by the surface of the glass lens has a very high intensity, it is reflected by the surfaces of the eyepiece 12 and the dichroic prism 14 of the visual axis detection apparatus, illuminated again to the photographer, and reflected again by the surface of the glass, thereby forming a ghost image. FIG. 8B shows paths in which the ghost images are formed. As indicated by an optical path 93, an infrared ray generated by the infrared-emitting diode 13 is reflected by the first surface 81a of the glass lens 81, reflected by an eyepiece incident surface 12a, reflected again by the first surface 81a of the glass lens 81, and formed by the imaging lens 65 as a ghost image on the image sensor 66 through the eyepiece 12 and the dichroic prism 14. Similarly, as indicated by an optical path 94 (broken line), the infrared ray passes through the eyepiece 12, is reflected by an exit surface 12b, and reflected again by the first surface 81a of the glass lens 81, thereby forming a ghost image. As indicated by an optical path 95, an infrared ray is reflected by the incident surface 14b-2 of the dichroic mirror 14 and reflected again by the glass lens 81, thereby forming a ghost image.

Figure 9B:
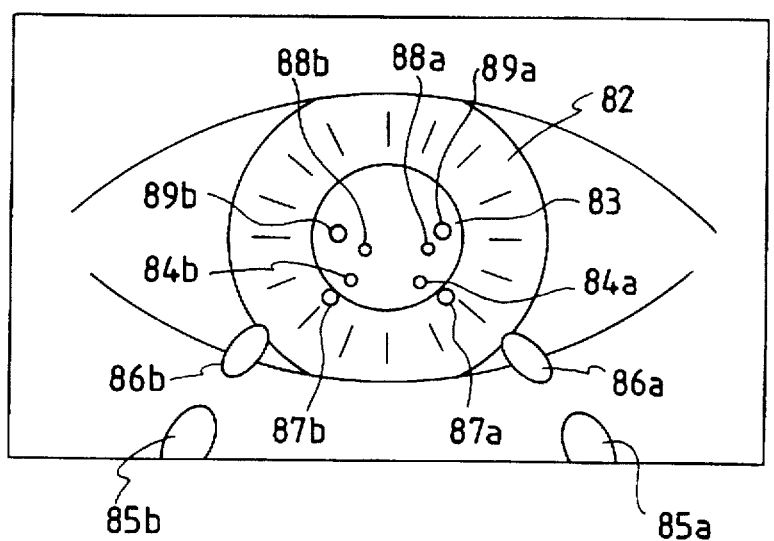

In FIG. 8B, for the descriptive convenience, the optical paths 93 and 94 are only the optical paths from the right infrared-emitting diode, and the optical path 95 is only the optical path from the left infrared-emitting diode. However, these optical paths are symmetrically present with respect to the finder optical axis 71. Therefore, a total of six ghost images are formed by reflecting the light by the glass lens 81 twice. The corresponding states of the eyeball's images are shown in FIG. 9B. The same reference numerals as in FIG. 9A denote the same parts in FIG. 9B, and a detailed description thereof will be omitted.

Ghost images 87a and 87b are formed along the optical path 93. Ghost images 88a and 88b are formed along the optical path 94. Ghost images 89a and 89b are formed along the optical path 95. Unlike the ghost images 85a to 86b obtained by single reflection on the glass lens, these ghost images 87a to 89b are formed near the cornea reflection images 84a and 84b to be detected, and the intensity of the ghost images 87a to 89b is weakened by repeated reflection. In addition, the size of the ghost images 87a to 87b is almost equal to that of the cornea reflection images. Therefore, these ghost images are erroneously detected as cornea reflection images.

The intensity of the ghost images 87a to 89b obtained by double reflection on the glass lens will be described in detail. If the surface reflectivities of the eyepiece 12 and the dichroic prism are given as 4 to 5%, each of the ghost images 84a to 85b obtained by single reflection on the glass lens has an intensity which is about 20 to 50 times the intensity of the cornea reflection image in a general glass lens when the intensity of the cornea reflection image is defined as 1. The output level of the image sensor is perfectly satisfied by the intensity of such a ghost image. The intensity of the ghost image obtained upon double reflection on the glass lens is 1/10 times that of the cornea reflection image. Therefore, this ghost image does not pose any problem on detection of cornea reflection images.

However, in a glass lens having a special coating or a mirror lens, the intensity of the ghost image obtained upon double reflection on the glass lens is 1/10 to 6/10 the intensity of the cornea reflection image. Therefore, the ghost image is erroneously detected as a cornea reflection image.

Figure 10:
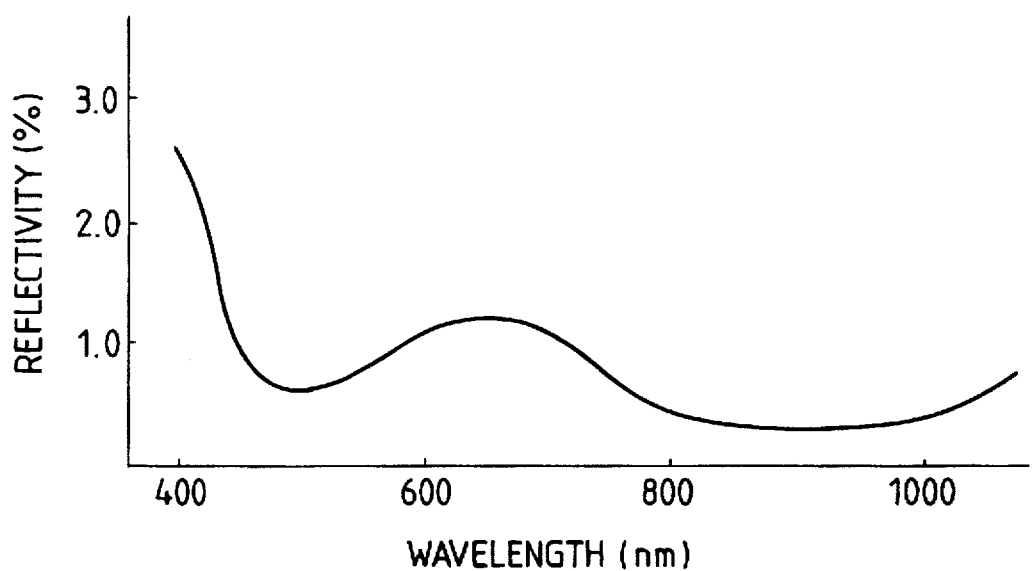
FIG. 10 is a graph showing the characteristics of an anti-reflection coating.

In this embodiment, surface coatings each constituted by a multi-layered interference film exhibiting reflection characteristics shown in FIG. 10 are formed on the incident surface 12a and the exit surface 12b of the eyepiece 12, and the incident surface 14b-2 of the dichroic prism 14.

The reflectivity for the near-infrared range (about 800 to 1,000 nm) as the wavelength region of the infrared-emitting diodes is decreased by this coating so as to obtain an anti-reflection effect. As a result, the wavelength range can be set lower than the visible range (400 to 700 nm). More specifically, the reflectivity in the near-infrared range is suppressed to be 2% or less.

The intensity of the ghost images 87a to 89b obtained upon double reflection on the glass lens surface can be reduced to substantially 1/10 or less, thereby stably detecting the cornea reflection images.

As can be apparent from the above description, the anti-reflection coatings need not be formed on all the incident and exit surfaces of the eyepiece 12 and the incident surface of the dichroic prism. It is, therefore, essential to set the reflectivity in the near-infrared range to be lower than that in the visible range.

Figure 11:
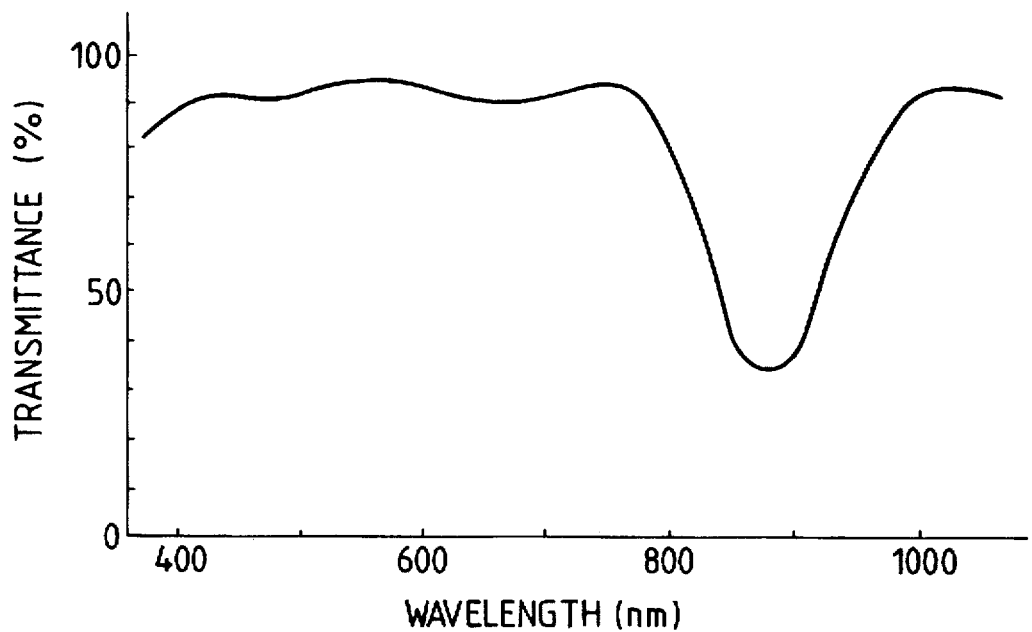
FIG. 11 is a graph showing the transmittance.
Figure 12:
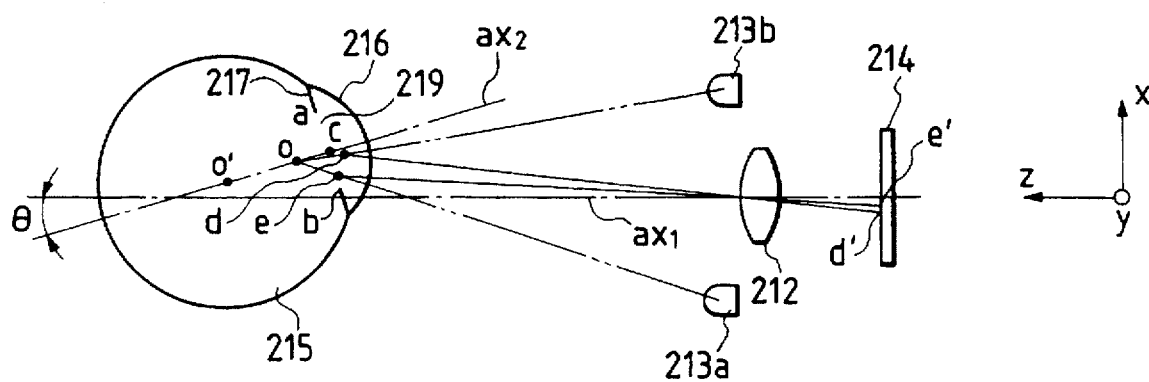
FIG. 12 is a view for explaining the principle of a method of detecting a visual axis.
Figure 13A:
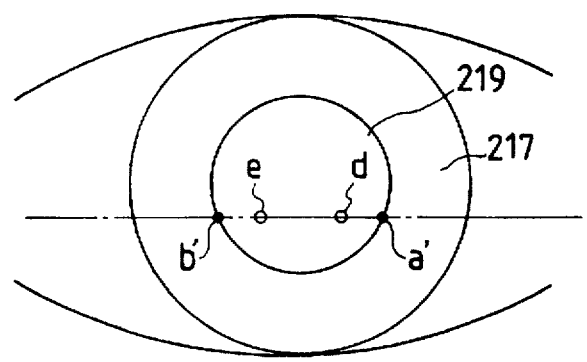
FIGS. 13 and 13B are views for explaining the relationship between an eyeball and outputs from an image sensor.
Figure 13B:
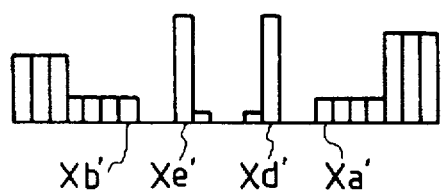

Another arrangement will be described as a means for reducing the ghost images obtained upon double reflection on the glass lens surface. FIG. 11 shows transmittance characteristics of a molding material (i.e., a material obtained by mixing an infrared absorbent dye in an acrylic resin) which can be used for an eyepiece. By this material, the transmittance only in the wavelength range of 880 nm of the infrared-emitting diodes is reduced to about 30 to 40%, and the transmittance in the visible range is about 90% or more. The cornea reflection images 84a and 84b are transmitted through the eyepiece 12 once, but the ghost images 88a to 89b obtained upon double reflection on the glass lens surface, as indicated by the optical paths 94 and 95, are transmitted through the eyepiece 12 twice. The relative intensity difference between the intensity of such a ghost image and the intensity of the cornea reflection image can be reduced by one transmission cycle, i.e., about 1/3 to 2/3 times, thereby effectively reducing the ghost intensity. An amount of light reaching the image sensor is reduced by this transmittance. By prolonging the accumulation time of the image sensor or increasing the gain, a similar eyeball's image (the intensity of the cornea reflection image) can be obtained, so that only the intensity of the ghost images can be relatively reduced.

Another embodiment for implementing another countermeasure for preventing hazardous light from reaching an image sensor will be described below.

Figure 17:
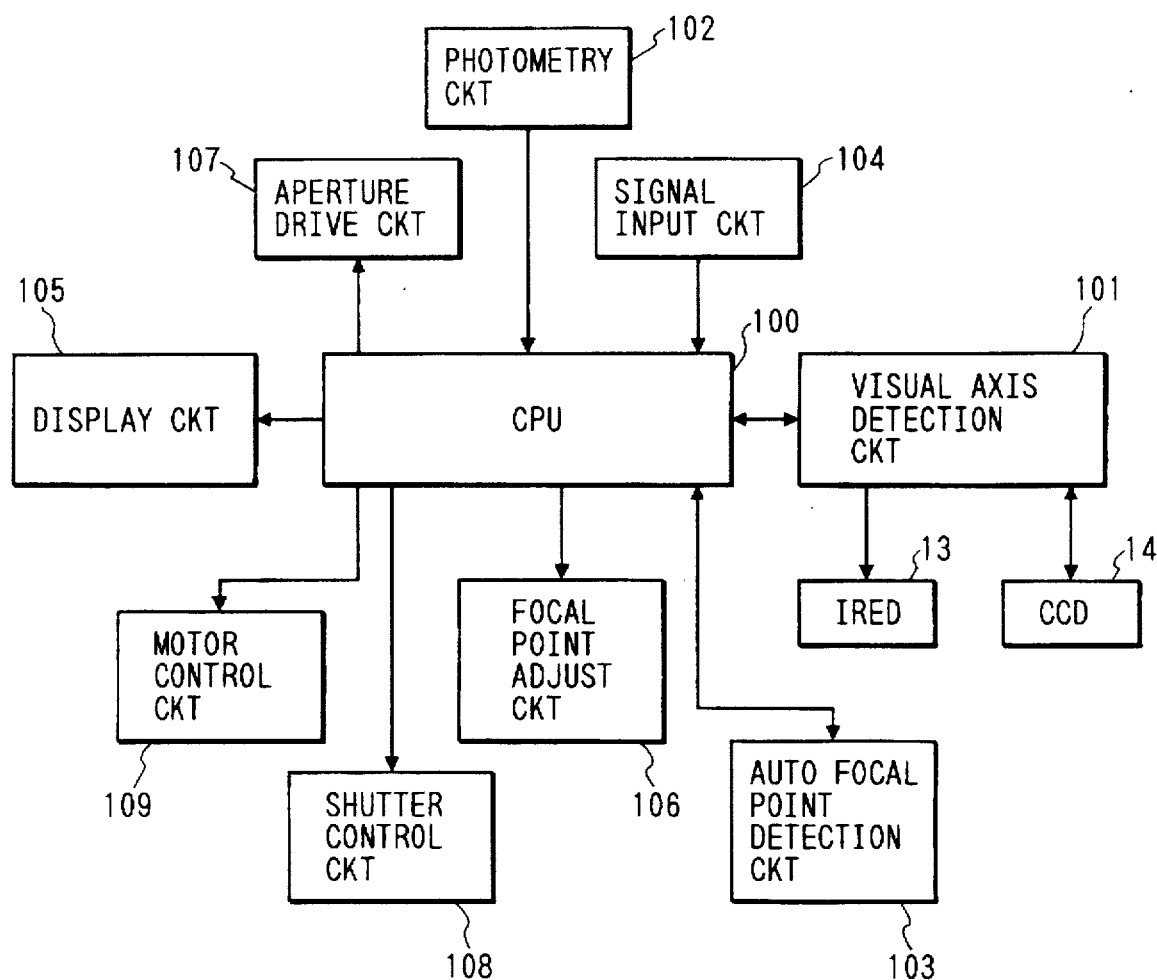
FIG. 17 is a view for explaining an electrical circuit of a camera.
Figure 18:
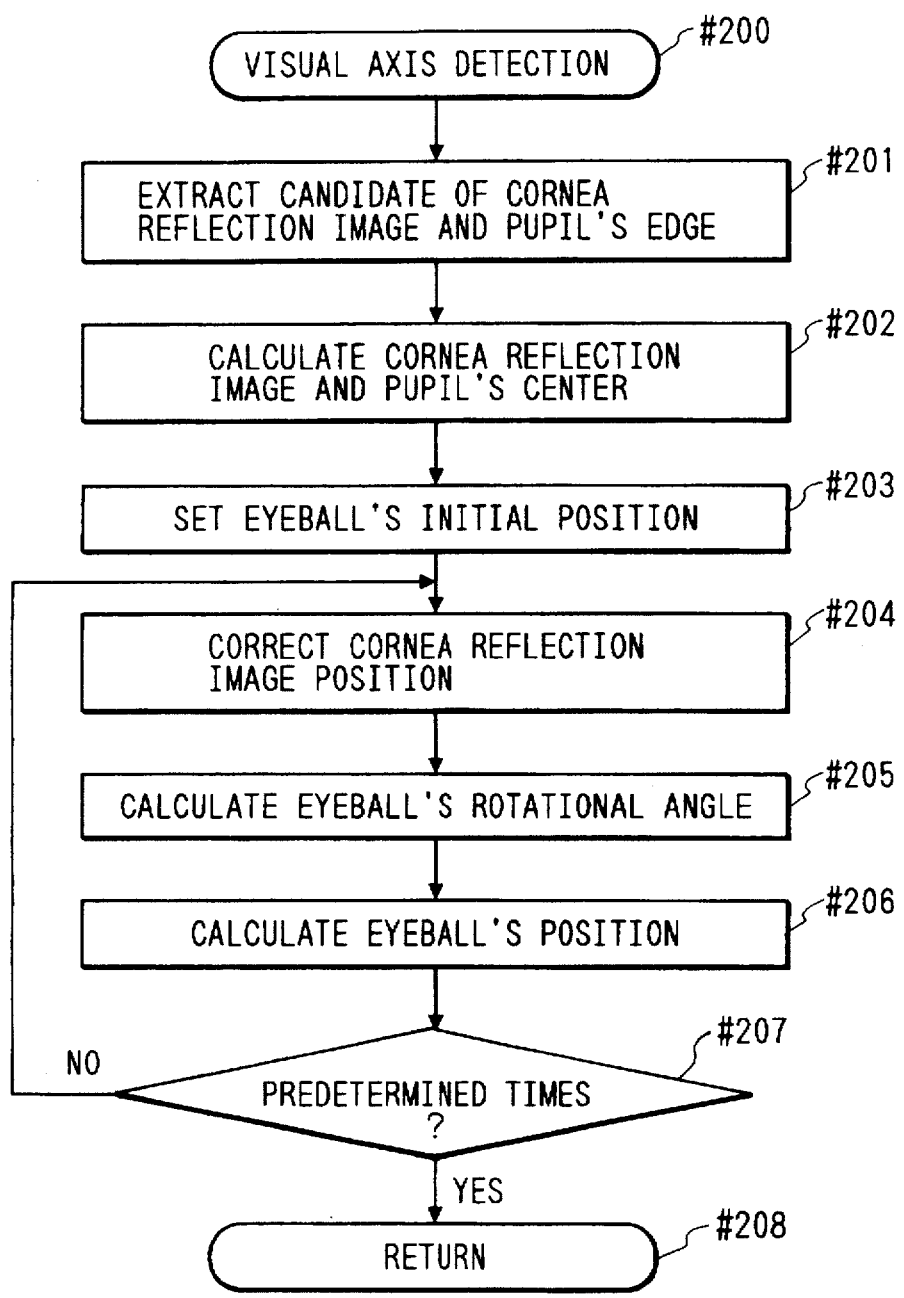
FIG. 18 is a flow for calculating the rotational angle of an eyeball.

FIGS. 14 to 18 show another embodiment of the present invention. FIG. 14A is a plan view showing a visual axis detection optical system. FIG. 14B is a graph showing spectral transmission characteristics of an optical filter. FIG. 15A is a developed plan view of the visual axis detection optical system. FIGS. 15B is a developed side view of the visual axis detection optical system. FIG. 16A is a developed plan view of the visual axis detection optical system to explain the size in FIG. 15A. FIG. 16B is a developed side view of the visual axis detection optical system to explain the size in FIG. 15B. FIG. 17 is a view for explaining the electrical circuit of a camera, and FIG. 18 is a flow chart for calculating a rotational angle of an eyeball.

FIGS. 15A and 15B are views obtained by developing an optical system along its optical axis. Referring to FIGS. 15A and 15B, when an eyeball 15 of an observer is illuminated with infrared rays from IREDs 13a and 13b, some of the infrared rays are reflected on the surface of a cornea 16, pass through an eyepiece 12, a beam splitter 14, and an aperture 64, and is focused on the light-receiving surface of a CCD 66 through a condenser lens 65. Cornea reflection images 19 are imaginary images of the IREDs 13a and 13b which are formed by reflection on the cornea 16. On the other hand, the infrared ray passing through the cornea 16 is scattered and reflected by an iris 17, similarly passes through the eyepiece 12, the beam splitter 14, and the aperture 64, and is focused on the light-receiving surface of the CCD 66 through the condenser lens 65. An infrared ray passing through the pupil reaches a retina, but it is rarely reflected by the retina. Therefore, the infrared ray passing through the pupil does not almost return to the CCD 66. The central emission wavelength is 0.88 μm.

Figure 14A:
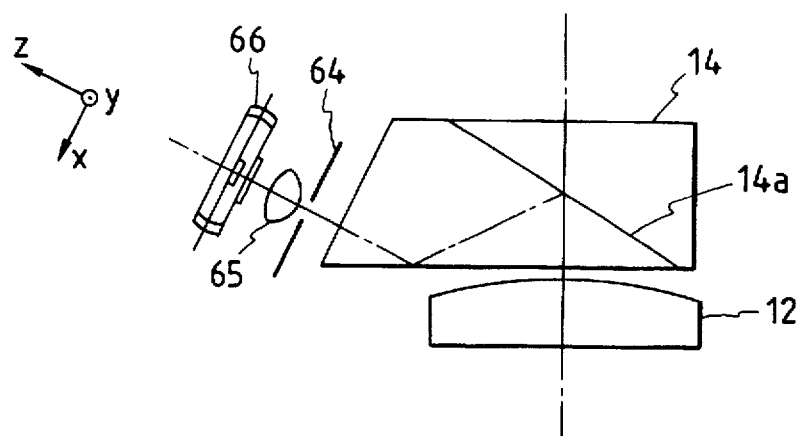
FIGS. 14A and 14B are a plan view of a visual axis detection optical system and a graph showing the spectral transmission characteristics of an optical filter, respectively.
Figure 14B:
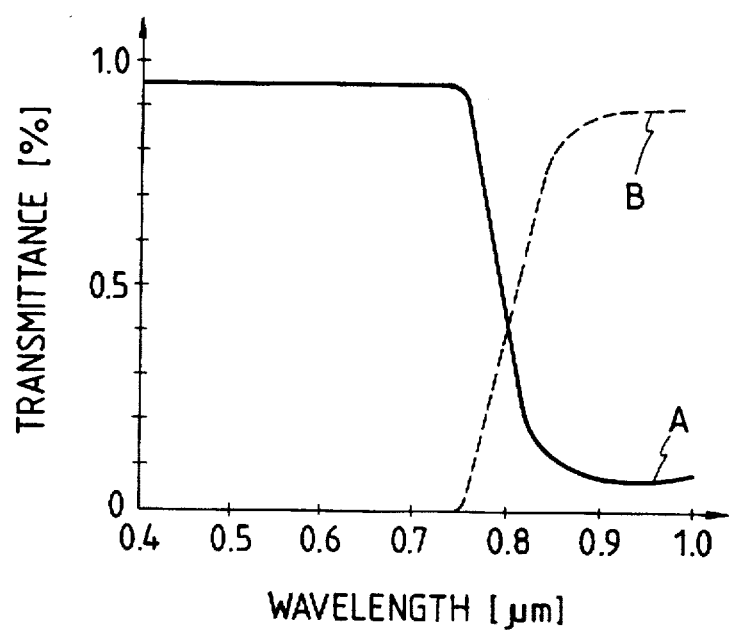

A dichroic mirror 14a of the beam splitter 14 is a first optical filter. A solid curve A in FIG. 14B represents spectral transmission characteristics. The transmittance is plotted along the ordinate in FIG. 14B, and the wavelength is plotted along the abscissa in FIG. 14B. The dichroic mirror 14a transmits visual light as finder light and reflects an infrared ray emitted from each IRED and reflected by the eyeball. The condenser lens 65 also serves as a second optical filter and is molded using a material for transmitting an infrared ray and absorbing visible light. A dotted curve B in FIG. 14B represents the spectral transmission characteristics of the condenser lens 65 for absorbing visible light and transmitting infrared rays in the emission wavelength range of the IRED. Even if the eyeball of the observer is illuminated with a sunbeam outdoors, the visible light component reflected by the dichroic mirror 14a serving as the first optical filter is absorbed by the condenser lens 65 serving as the second optical filter through the aperture 64 and does not reach the CCD 66 because the condenser lens 65 is located between the beam splitter 14 and the CCD 66. As a result, a stable eyeball's image free from the influences of external light such as the sunbeam is obtained on the CCD 66.

The eyeball 15 of the observer who observes an object image through the camera finder is moved in the X-Y-Z plane with respect to the eyepiece 12. The condenser lens 65 in the visual axis detection optical system is designed such that the iris 17 of the eyeball 15 of the observer is almost conjugate to the light-receiving surface of the CCD 66 when the eyeball 15 of the observer is located at a predetermined position (i.e., generally, a designed pupil position in the finder optical system) spaced apart from the eyepiece 12.

When accumulation of a predetermined light amount distribution of the eyeball's image is completed in the CCD 66, a visual axis detection circuit 101 amplifies an image signal of the CCD 66 and sends an amplified signal to a CPU 100. In the CPU 100, an eyeball's image signal is A/D-converted, and the resultant digital signal is subjected to feature extraction of the eyeball in accordance with a predetermined algorithm. When the position of each cornea reflection image and the central position of the pupil are obtained by a series of arithmetic operations, the rotational angle of the eyeball of the observer is calculated on the basis of the calculation values in a manner to be described later. The observation position of the observer within the finder is calculated in accordance with the rotational angle of the eyeball of the observer.

In the CPU 100 serving as an arithmetic circuit for calculating a visual axis, a rotational angle $\Theta$ of the eyeball of the observer is calculated in accordance with the position of each cornea reflection image and the central position of the pupil. This rotational angle is basically obtained in accordance with the calculations described previously. Equations obtained from a viewpoint different from that of the previous equations will be represented below.

If the position of the middle point of the pair of cornea reflection images 19 on the CCD 66 is defined as $(X_{po}, Y_{po})$, and the position of the center of the pupil is defined as $(X_{ic}, Y_{ic})$, a rotational angle $\theta_x$ of the eyeball 15 of the observer in the x direction with respect to the z-axis satisfies the following equation:

$$\beta \times OC \times \sin \theta_x = ((X_{po} + \delta_x) - X_{ic}) \times \text{PITCHx} \quad (6)$$

where $\beta$ is the imaging magnification of the visual axis detection optical system, OC is a distance between a center o of curvature of the cornea 16 and a center c of the pupil, and Pitchx is the pixel pitch of the CCD 66 in the x direction, and x is the multiplication sign.

Similarly, a rotational angle $\theta_y$ of the eye ball of the observer in the y direction with respect to the z-axis satisfies the following equation $$\beta \times OC \times \sin \theta_y = ((Y_{po} + \delta_y) - Y_{ic}) \times \text{PITCHy} \quad (7)$$

where Pitchy is the pixel pitch of the CCD 66 in the y direction.

The correction terms $\delta_x$ and $\delta_y$ of the position of the middle point between the cornea reflection images change in accordance with a shift amount of the position of the eyeball of the observer with respect to the reference position of the visual axis detection optical system.

A method of calculating the correction terms $\delta_x$ and $\delta_y$ of the position the middle point between the cornea reflection images and a method of calculating the rotational angle of the eyeball will be described with reference to FIGS. 16A to 18.

The reference position (origin) of the visual axis detection optical system is set as an intersection F between the optical axis (z-axis) of the visual axis detection optical system and the exit surface of the eyepiece 12. Let the coordinates of the IRED 13a, the IRED 13b, the center o of curvature of the cornea 16 of the eyeball of the observer, and the radius of curvature of the cornea 16 be (Sxi,Syi,Szi), (-Sxi,Syi,Szi), (Sxc,Syc,Szc), and Rc, respectively.

The CPU 100 detects boundary pixels between the cornea reflection images, the pupil, and the iris in accordance with the eyeball's image data obtained from the visual axis detection circuit 101 (#201). The CPU 100 extracts a correct pair of cornea reflection images from the candidates of a plurality of cornea reflection images and calculates the center of the pupil from large number of pupil's edge data (#202). Let a z-direction distance between the vertex of the cornea 16 and the reference position F of the visual axis detection optical system be Sze. Let coordinates of a pair of cornea reflection images P1 and P2 on the CCD 66 be $(X_{p1}, Y_{p1})$, $(X_{p2}, Y_{p2})$. Let coordinates of the middle point between the cornea reflection images be $(X_{po}, Y_{po})$. Let the position of the center of the pupil be $(X_{ic}, Y_{ic})$.

Initial values must be given because the coordinates of the center o of the curvature of the eyeball of the observer are unknown in calculation of the rotational angle of the eyeball. The initial values are given (#203) as follows under the assumption that the center of the curvature of the cornea of the eyeball of the observer is located on the optical axis of the visual axis detection optical system:

Sxc=0
Syc=0
Szc=Sze+Rc

The z-direction distance Sze between the vertex of the cornea of the eyeball of the observer and the reference position F of the visual axis detection optical system is calculated as a function of a distance between the pair of cornea reflection images P1 and P2.

When the position of the center of curvature of the cornea of the eyeball of the observer is set, the correction amounts $\delta_z$ and $\delta_y$ of the position of the middle point between the cornea reflection images are calculated as follows.

The middle point Po between the cornea reflection images P1 and P2 is equivalent to the position of the cornea reflection image obtained when only one IRED is located at a middle point G between the IREDs 13a and 13b. A distance L between the middle point G between the IREDs 13a and 13b and the center o of the curvature of the cornea 16 is defined as follows:

$$L = SQR(Sxc^2 + (Syi-Syc)^2 + (Szi-Szc)^2) \tag{8}$$

where ^ represents a square.

A distance from the surface of the cornea to the position Po where cornea reflection images (imaginary images) are formed is defined as follows in accordance with the Snell laws of refraction:

$$K = \frac{Rc \times (L + Rc)}{2 \times (L + Rc) - Rc} \tag{9}$$

The x-direction shift correction amount $\delta_x$ of the middle point Po between the cornea reflection images P1 and P2 satisfies the following equation:

$$\frac{X_{po} + \delta_x}{\delta_x} = \frac{L}{K - Rc}$$

The shift correction amount $\delta_x$ for developing the above equation is defined as follows:

$$\delta_x = -\frac{Rc}{2 \times (L + Rc)} \times X_{po} \tag{10}$$

Similarly, the y-direction shift correction amount $\delta_y$ of the middle point Po between the cornea reflection images P1 and P2 satisfies the following equation:

$$\frac{Y_{po} + Syi \times \beta/Pitchy + \delta_y}{\delta_y} = \frac{L}{K - Rc}$$

The shift correction amount $\delta_y$ for developing the above equation is defined as follows:

$$\delta_y = -\frac{Rc}{2 \times (L + Rc)} \times \left( Y_{po} + \frac{Syi \times \beta}{Pitchy} \right) \tag{11}$$

When the shift correction amounts $\delta_x$ and $\delta_y$ are calculated (#204), rotational angles $\theta_x$ and $\theta_y$ of the eyeball are calculated on the basis of equations (6) and (7) (#205).

When the rotational angles $\theta_x$ and $\theta_y$ of the eyeball of the observer are calculated, the coordinates (Sxc,Syc,Szc) of the center o of curvature of the cornea 16 of the eyeball of the observer are calculated as follows:

$$Sxc = \frac{Xic \times Pitchx}{\beta} + OC \times SIN\theta_x \tag{12}$$

$$Syc = \frac{Yic \times Pitchy}{\beta} + OC \times SIN\theta_y \tag{13}$$

$$Szc = Szi - SQR\frac{\{Rc \times (2 \times Sxi + \Delta)\}^{\wedge}2}{4 \times \Delta^{\wedge}2} - \tag{14}$$

$$(Sxi - Sxc)^{\wedge}2 - (Syi - Syc)^{\wedge}2$$

for $$\Delta = \frac{|X_{p1} - X_{p2}| \times Pitchx}{\beta}$$

If the number of calculations of the rotational angle of the eyeball is a predetermined number of times (e.g., three times) or less, the eyeball's rotational angle calculation routine is executed again using the latest coordinates (Sxc, Syc,Szc) of the center of curvature of the cornea (#207). If the number of calculations of the eyeball's rotational angle reaches the predetermined number of times, the eyeball's rotational angle and the value of the position of the center of curvature of the cornea are converged, and the eyeball's rotational angle calculation routine is ended. The position (i.e., the position of the visual axis) of the observer within the finder is calculated as follows (#208).

In the finder of a single-lens reflex camera, coordinates (X,Y) of the observation position on the focusing screen serving as the observation surface are represented as follows:

$$X = M \times (A_x \times \theta_x + B_x) \tag{15}$$

$$Y = M \times (A_y \times \theta_y + B_y) \tag{16}$$

where M is the conversion coefficient for converting the eyeball's rotational angles into the coordinates on the focusing screen within the finder, and $A_x$, $B_x$, $A_y$, and $B_y$ are correction coefficients for correcting characteristics unique to the observer when the eyeball's rotational angles are converted into the coordinates on the focusing screen within the finder.

When the coordinates of the visual axis of the observer on the focusing screen are calculated, the CPU 100 sends a focal point detection start signal to an auto focal point detection circuit 103 so as to perform focal point detection of a photographic lens 1 in a focal point detection area near the calculated observation point of the observer. The auto focal point detection circuit 103 sends an object signal of the predetermined focal point detection area obtained from a focal point detection unit 6 to the CPU 100. The CPU 100 calculates a focal point adjust state of the focal point detection area close to the observation position of the observer within the finder and sends the focal point adjust amount and direction for adjusting the photographic lens 1 in the in-focus state to a focal point adjust circuit 106. The focal point adjust circuit 106 transmits a drive signal to the photographic lens drive motor to move the photographic lens 1 to the in-focus position. When the CPU 100 determines that the photographic lens 1 is set in the in-focus position, the CPU 100 outputs an in-focus display signal to a display circuit 105, thereby displaying an in-focus state on the display circuit 105. The in-focus state is displayed by turning on a predetermined superimposition LED 20.

When the observer recognizes that the photographic lens is focused on the object gazed upon by the observer and depresses a release switch (not shown) to the second stroke so as to perform a photographic operation, a signal input circuit 104 transmits a release signal to the CPU 100. The CPU 100 receives photometric information from a photometry circuit 102 and determines an exposure value. The CPU 100 sends an f-number determined by an aperture drive circuit 107, and at the same time outputs shutter speed information to a shutter control circuit 108. When a main mirror 2 and a sub mirror are retracted outside the photographic optical path, a shutter 4 is opened to expose a film 5.

When the shutter 4 is closed to finish exposing the film 5, the CPU 100 transmits a film winding signal to a motor control circuit 109, thereby winding the film 5.

Figure 19A:
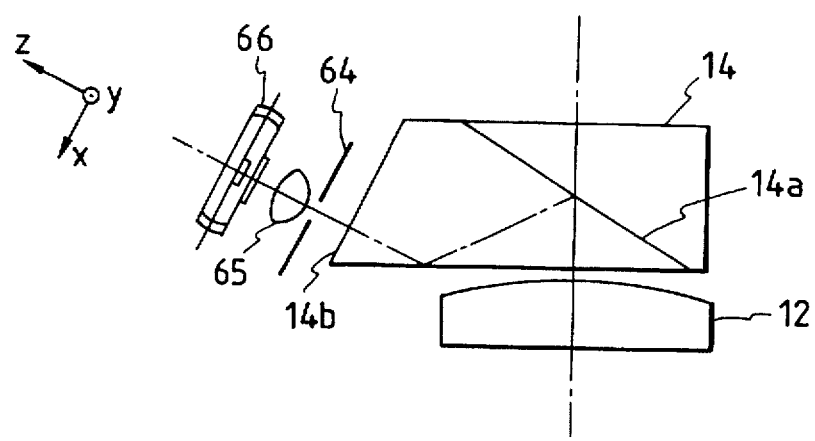
FIG. 19A is a plan view of the visual axis detection optical system and FIG. 19B is a graph showing the spectral transmission characteristics of an optical filter.
Figure 19B:
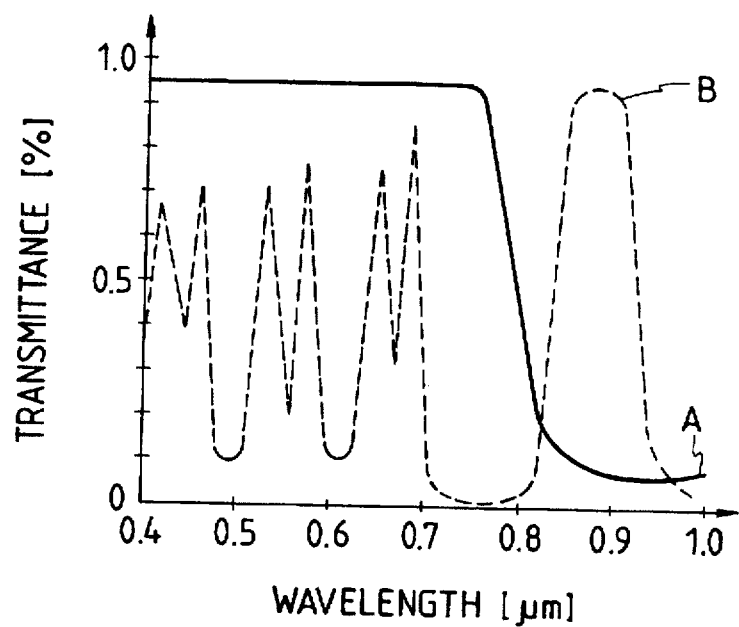
Figure 20A:
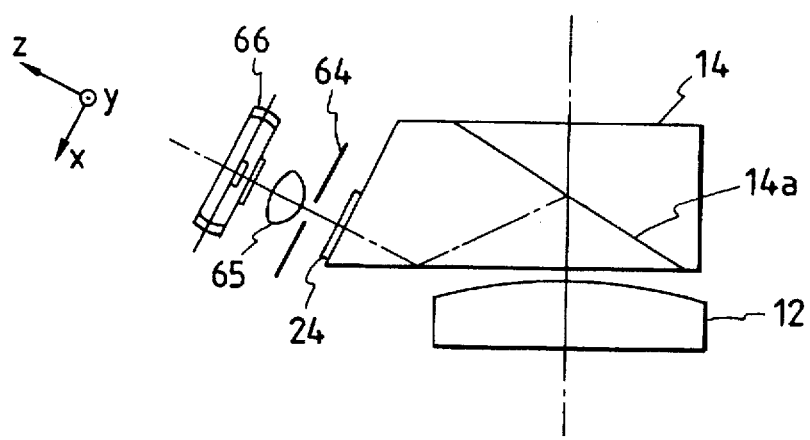
FIG. 20A is a plan view of a visual axis detection optical system and FIG. 20B is a plan view of the visual axis detection optical system.
Figure 20B:
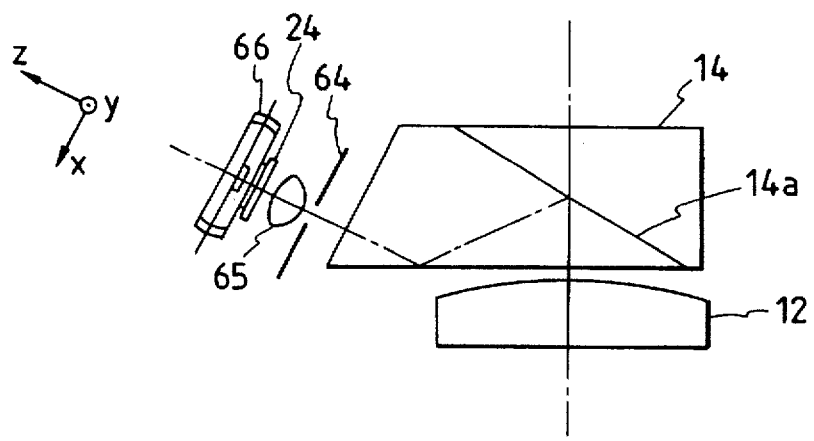
Figure 21:
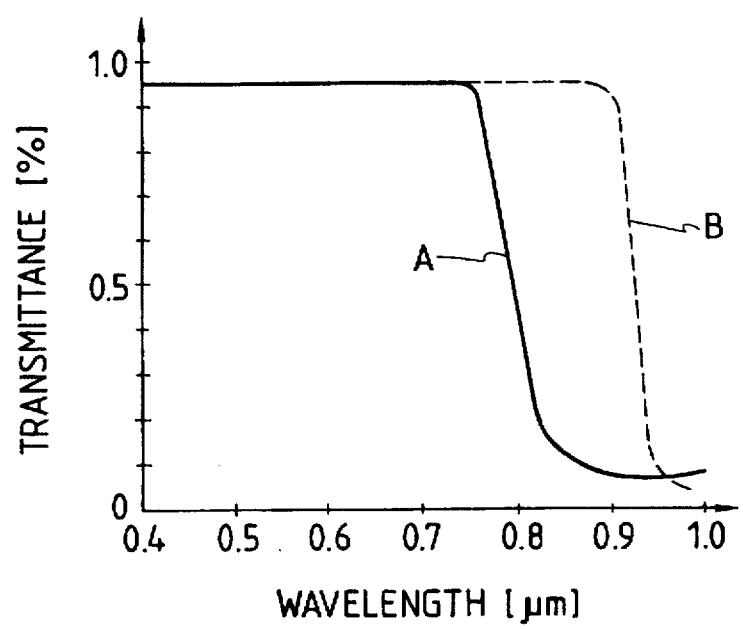
FIG. 21 is a graph showing the spectral transmission characteristics of an optical filter.

FIGS. 19A to 21 show still another embodiment according to the present invention. FIG. 19A is a plan view of a visual axis detection optical system. FIG. 19B is a graph showing the spectral transmission characteristics of an optical filter. FIGS. 20A and 20B are plan views of the visual axis detection optical system, and FIG. 21 is a graph showing the spectral transmission characteristics of the optical filter. A camera exemplified in this embodiment is identical to that in FIG. 15A, and an electric circuit arranged in the camera is identical to that in FIG. 17.

Unlike the arrangement in FIG. 15A, the layout of the visual axis detection optical system according to this embodiment is developed along the x-z plane, as shown in FIG. 19A and FIGS. 20A and 20B.

When the observer who observes an object image through a camera finder depresses a release switch (not shown) to the first stroke, a signal input circuit 104 detects the depression of the release switch and transmits its input signal to a CPU 100. When the CPU 100 detects that the release switch has been depressed to the first stroke, the CPU 100 sends an instruction for executing visual axis detection to a visual axis detection circuit 101. The visual axis detection circuit 100 turns the IREDs 13a and 13b on to illuminate the eyeball of the observer. Accumulation of eyeball's images is started by a CCD 66 at the ON timing of the IREDs 13a and 13b.

When the eyeball 15 of the observer is illuminated with the IREDs 13a and 13b, some infrared rays are reflected on the surface of a cornea 16, pass through a beam splitter 14 and an aperture 64, and focused on the light-receiving surface of the CCD 66 through a condenser lens 65. Cornea reflection images are imaginary images of the IREDs 13a and 13b which are formed upon reflection on the cornea 16. Infrared rays passing through the cornea 16 are reflected by the iris, pass through the eyepiece 12, the beam splitter 14, and the aperture 64, and focused on the light-receiving surface of the CCD 66 through the condenser lens 65. The infrared rays passing through the pupil reach the retina but are rarely reflected by the retina. Therefore, the infrared rays passing through the pupil will not almost return to the CCD 66.

A dichroic mirror 14a of the beam splitter 14 serves as a first optical filter and has spectral transmission characteristics of the dichroic mirror 14a, as indicated by a solid curve in FIG. 19B. In the dichroic mirror 14a, visible light as finder light is transmitted, and an infrared ray illuminated from each IRED and reflected by the eyeball is reflected. An exit surface 14b of the beam splitter 14 serves as a second optical filter on which a dielectric multi-layered film is deposited. A dotted curve B in FIG. 19B represent spectral transmission characteristics of a deposition surface 14b of the dielectric multi-layered film. These characteristics are of a bandpass filter for transmitting rays of the emission wavelength range of the IREDs. Even if the eyeball of the observer is illuminated with a sunbeam outdoors, the visible light component reflected by the dichroic mirror 14a serving as the first optical filter is reflected by the bandpass filter 14b serving as the second optical filter and does not reach the CCD 66 because the bandpass filter 14b is located between the beam splitter 14 and the CCD 66. As a result, a stable eyeball's image free from the influences of external light such as the sunbeam is obtained on the CCD 66. As can be apparent from the dotted curve B in FIG. 19B, the bandpass filter 14b has the transmission range in part of the visible light region. When visible light components adversely affect the eyeball's image obtained by the CCD 66, the condenser lens 65 is preferably made of a visible light absorbent material.

When the eyeball of the observer is located at a predetermined position (e.g., generally the pupil position of the finder optical system) spaced apart from the eyepiece 12, the condenser lens 65 of the visual axis detection optical system causes the iris of the eyeball of the observer to conjugate to the light-receiving surface of the CCD 66.

The eyeball of the observer who observes an object image through the camera finder can be freely moved in the X-Y-Z plane with respect to the eyepiece 12.

When accumulation of predetermined eyeball's images is completed in the CCD 66, the visual axis detection circuit 101 amplifies an image signal from the CCD 66 and sends the amplified signal to the CPU 100. In the CPU 100, the eyeball's image signal is A/D-converted, and the resultant digital data is subjected to feature extraction, i.e., detection of boundary pixels between the cornea reflection images, the pupil, and the iris, in accordance with a predetermined algorithm. The CPU 100 extracts a correct pair of cornea reflection images from the candidates of a plurality of cornea reflection images. In addition, the CPU 100 calculates the center of the pupil from a large amount of pupils edge data.

When the cornea reflection images and the coordinates of the center of the pupil are calculated, the observation position of the observer within the finder is calculated on the basis of equations (6) to (16).

In this embodiment, the bandpass filter serving as the second optical filter is formed by depositing the dielectric multi-layered film on the surface 14b of the beam splitter 14. However, a dielectric multi-layered film may be deposited on one surface of a glass plate, and this glass plate may be arranged between the beam splitter 14 and the CCD 66.

FIG. 20A shows a case in which a bandpass filter 24 of a glass plate having the spectral transmission characteristics shown in FIG. 19B is adhered to the exit surface of the beam splitter 14 on the visual axis detection optical system side. As a result, even if an eyeball of an observer is illuminated with a sunbeam outdoors, the infrared components reflected by the dichroic mirror 14a serving as the first optical filter are reflected by the bandpass filter 24 serving as the second optical filter and do not reach the CCD 66.

Similarly, FIG. 20B shows a case in which a bandpass filter 24 of a glass plate having the spectral transmission characteristics in FIG. 19B is adhered to the light incident surface of the CCD 66. As a result, even if an eyeball of an observer is illuminated with a sunbeam outdoors, the far-infrared components reflected by the dichroic mirror 14a serving as the first optical filter pass through the aperture 64 and the condenser lens 65 and are reflected by the bandpass filter 24 serving as the second optical path. These components do not reach the CCD 66.

The spectral transmission characteristics of the second optical filter shown in FIGS. 19A, 20A, and 20B may be replaced with characteristics for reflecting far-infrared rays, as indicated by a dotted curve B in FIG. 21. Assume that this far-infrared cut filter is arranged as the filter 24 in FIG. 20A. Even if an eyeball of an observer is illuminated with a sunbeam outdoors, the far-infrared components reflected by the dichroic mirror 14a serving as the first optical filter are reflected by the filter 24 serving as the second optical filter and do not reach the CCD 66.

The above embodiment exemplifies an application to a single-lens reflex camera, but is applicable to the finder portion of a range finder camera or an observation apparatus. Outputs from the visual axis detection apparatus are used not only for selection of the focal point detection area but also for selection of the position of the center of gravity of the photometric distribution and an operation of some functions of an optical apparatus.

In the above embodiment, the first filter reflects an infrared ray, and the second filter transmits the infrared ray. However, a beam splitter for causing the first filter to transmit an infrared ray and the second filter to reflect the infrared ray may be arranged.

As has been described above, in an optical apparatus having a visual axis detection apparatus comprising an illuminating means for illuminating an eyeball of an observer who observes an object image through a finder, a light-receiving means for receiving light reflected by the eyeball of the observer, and an arithmetic means for calculating a visual axis of the observer from an eyeball's image obtained from the light-receiving means, the visual axis detection apparatus comprises first and second optical filters having wavelength selectivity, so that the influence of external light such as a sunbeam which illuminates the eyeball of the observer can be eliminated to perform stable visual axis detection.

A condenser lens as one constituent element of the light-receiving means also serves as a second wavelength selectivity optical filter, thereby achieving a compact, low-cost arrangement.

What is claimed is:

1. An apparatus for measuring an anterior eye portion, said apparatus comprising:

finder means for observing a view field;

illuminating means for illuminating the anterior eye portion, light-receiving means for receiving light from the anterior eye portion;

holding means for holding said finder means, said illuminating means, and said light-receiving means as a unit in a single body; and a casing body in which said holding means is disposed.

2. An apparatus according to claim 1, wherein said holding means comprises a first holding member for holding said finder means and said illuminating means, and a second holding member for holding said light-receiving means.

3. An apparatus according to claim 1, wherein said light-receiving means comprises a prism portion for bending the light from the anterior eye portion and a light-receiving portion for receiving light emerging from said prism portion.

4. An apparatus according to claim 3, wherein said prism portion has a light-splitting surface for reflecting light in an infrared region and transmitting visible light.

5. An apparatus according to claim 1, wherein said casing body is a camera body.

* * * * *